United States Patent
Eberle et al.

(10) Patent No.: US 6,850,603 B1
(45) Date of Patent: Feb. 1, 2005

(54) SYSTEM AND METHOD FOR THE CREATION AND AUTOMATIC DEPLOYMENT OF PERSONALIZED DYNAMIC AND INTERACTIVE VOICE SERVICES

(75) Inventors: Hannes Eberle, Arlington, VA (US); Christopher S. Leon, Washington, DC (US); Bodo Maass, Arlington, VA (US); Anurag Patnaik, Arlington, VA (US); Alberto Santa Ana, Falls Church, VA (US); Michael Zirngibl, Washington, DC (US); Benjamin Reyes, Falls Church, VA (US); Wolf Mosle, McLean, VA (US)

(73) Assignee: MicroStrategy, Incorporated, McLean, VA (US)

( * ) Notice: Subject to any disclaimer, the term of this patent is extended or adjusted under 35 U.S.C. 154(b) by 0 days.

(21) Appl. No.: 09/454,602

(22) Filed: Dec. 7, 1999

Related U.S. Application Data

(60) Provisional application No. 60/153,222, filed on Sep. 13, 1999.

(51) Int. Cl.[7] .......................... H04M 1/64; H04M 3/00
(52) U.S. Cl. ................................ 379/88.16; 379/88.17; 379/88.18; 379/265.01; 379/265.09; 379/266.07; 379/908
(58) Field of Search .......................... 379/67.1, 88.13, 379/88.14, 88.15, 88.16, 88.17, 265.09, 900, 901, 908, 265.01, 266.07, 88.18, 88.12

(56) References Cited

U.S. PATENT DOCUMENTS

| | | | |
|---|---|---|---|
| 4,156,868 A | 5/1979 | Levinson | 704/251 |
| 4,554,418 A | 11/1985 | Toy | 379/88.01 |
| 4,757,525 A | 7/1988 | Matthews et al. | 379/88.26 |

(List continued on next page.)

FOREIGN PATENT DOCUMENTS

| | | |
|---|---|---|
| EP | 0878948 | 11/1998 |
| EP | 0889627 | 1/1999 |

OTHER PUBLICATIONS

MSTR001—Advertisement for Progressive Telecommunications Corporation's OPUS (undated).
MSTR002—KnowledgeX Workgroup Edition Publication (undated).
MSTR003—Relational OLAP Server, MicroStrategy; DSS Server Brochure, 1996.
MSTR004—Relational OLAP Interface for the Web, 1996.
MSTR005—"Andyne Introduces Greater Flexibility for Database Queries; New Query Management Option Provides Enhanced Management for Enterprise–Wide Queries," Business Wire, Jan. 3, 1996. Available from the Dow Jones Interactive Web Site http://Ptg.djnr.com.

(List continued on next page.)

Primary Examiner—Allan Hoosain
(74) Attorney, Agent, or Firm—Mintz Levin Cohn Ferris Glovsky and Popeo PC

(57) ABSTRACT

This invention relates to a system and method for creation and automatic deployment of personalized, dynamic and interactive voice services, including information derived from on-line analytical processing (OLAP) systems and other data repositories. More specifically, the invention relates to a system and method that enable personalized delivery of information in real-time, via natural language voice communication with a voice-enabled terminal device. The system and method combines personalized information broadcast technology with an active voice page. An active voice page is created by the system, stored in a call database and used to generate dynamic voice menus. A call server retrieves the AVP from the call database and delivers the content of the service by dialing a subscriber's telephone number, speaking message text to the subscriber and recording the subscriber's input in response to the call menus. A unique AVP is generated for each subscriber scheduled to receive voice service content.

22 Claims, 14 Drawing Sheets

U.S. PATENT DOCUMENTS

| | | |
|---|---|---|
| 4,775,936 A | 10/1988 | Jung ............................ 705/5 |
| 4,785,408 A | 11/1988 | Britton et al. .............. 704/270 |
| 4,788,643 A | 11/1988 | Trippe et al. .................. 705/6 |
| 4,811,379 A | 3/1989 | Grandfield ................ 340/7.23 |
| 4,812,843 A * | 3/1989 | Champion, III et al. .... 340/905 |
| 4,837,798 A | 6/1989 | Cohen et al. ............ 379/88.14 |
| 4,868,866 A | 9/1989 | Williams, Jr. .................. 707/9 |
| 4,941,168 A | 7/1990 | Kelly et al. .................... 379/69 |
| 4,942,616 A | 7/1990 | Linstroth et al. ........... 704/275 |
| 4,953,085 A | 8/1990 | Atkins ........................ 705/36 |
| 4,972,504 A | 11/1990 | Daniel, Jr. et al. ............ 705/10 |
| 4,989,141 A | 1/1991 | Lyons et al. .................. 705/36 |
| 5,021,953 A | 6/1991 | Webber et al. ................ 705/6 |
| 5,101,352 A | 3/1992 | Rembert ........................ 705/8 |
| 5,128,861 A | 7/1992 | Kagami et al. ............... 705/10 |
| 5,131,020 A | 7/1992 | Liebesny et al. ........ 455/414.3 |
| 5,168,445 A | 12/1992 | Kawashima et al. .......... 705/10 |
| 5,187,735 A | 2/1993 | Herrero Garcia et al. ....................... 379/88.17 |
| 5,189,608 A | 2/1993 | Lyons et al. .................. 705/30 |
| 5,204,821 A | 4/1993 | Inui et al. ................... 700/106 |
| 5,214,689 A | 5/1993 | O'Sullivan ................. 379/88.1 |
| 5,235,680 A | 8/1993 | Bijnagte ...................... 707/10 |
| 5,237,499 A | 8/1993 | Garback ........................ 705/5 |
| 5,255,184 A | 10/1993 | Hornick et al. ................. 705/6 |
| 5,270,922 A | 12/1993 | Higgins ....................... 705/37 |
| 5,323,452 A | 6/1994 | Dickman et al. ...... 379/201.04 |
| 5,347,632 A | 9/1994 | Filepp et al. ............... 709/202 |
| 5,371,787 A | 12/1994 | Hamilton et al. ........... 379/386 |
| 5,404,400 A | 4/1995 | Hamilton et al. ........... 379/386 |
| 5,406,626 A | 4/1995 | Ryan et al. ................... 705/51 |
| 5,444,768 A | 8/1995 | Lemaire et al. ............... 379/68 |
| 5,452,341 A | 9/1995 | Sattar ..................... 379/88.27 |
| 5,457,904 A | 10/1995 | Colvin ........................ 40/119 |
| 5,479,491 A | 12/1995 | Herrero Garcia et al. ....................... 379/88.15 |
| 5,493,606 A | 2/1996 | Osder et al. ............. 379/88.05 |
| 5,500,793 A | 3/1996 | Deming, Jr. et al. .......... 705/37 |
| 5,502,637 A | 3/1996 | Beaulieu et al. .............. 705/36 |
| 5,524,051 A | 6/1996 | Ryan ......................... 380/237 |
| 5,539,808 A | 7/1996 | Inniss et al. ............. 379/88.22 |
| 5,555,403 A | 9/1996 | Cambot et al. ................ 707/4 |
| 5,572,643 A | 11/1996 | Judson ....................... 709/28 |
| 5,572,644 A | 11/1996 | Liaw et al. ................. 715/531 |
| 5,576,951 A | 11/1996 | Lockwood .................... 705/27 |
| 5,577,165 A | 11/1996 | Takebayashi et al. ...... 395/2.84 |
| 5,590,181 A | 12/1996 | Hogan et al. .......... 379/114.14 |
| 5,604,528 A | 2/1997 | Edwards et al. ............... 725/25 |
| 5,630,060 A | 5/1997 | Tang et al. ................. 709/238 |
| 5,638,424 A | 6/1997 | Littleton et al. ......... 379/88.18 |
| 5,638,425 A | 6/1997 | Hayden et al. ........... 379/88.01 |
| 5,664,115 A | 9/1997 | Fraser ........................ 705/37 |
| 5,684,992 A | 11/1997 | Abrams et al. ............. 709/314 |
| 5,689,650 A | 11/1997 | Sloan et al. ................... 705/36 |
| 5,692,181 A * | 11/1997 | Anand et al. ................ 395/613 |
| 5,701,451 A | 12/1997 | Rogers et al. ................ 707/1 |
| 5,706,442 A | 1/1998 | Anderson et al. ............. 705/27 |
| 5,710,889 A | 1/1998 | Clark et al. ................. 235/379 |
| 5,712,901 A | 1/1998 | Meermans ............... 379/88.14 |
| 5,715,370 A | 2/1998 | Luther et al. ............. 395/2.84 |
| 5,717,923 A | 2/1998 | Dedrick ...................... 707/102 |
| 5,721,827 A * | 2/1998 | Logan et al. .......... 395/200.47 |
| 5,724,410 A | 3/1998 | Parvulescu et al. ...... 379/88.18 |
| 5,724,525 A | 3/1998 | Beyers, II et al. ............ 705/40 |
| 5,732,216 A * | 3/1998 | Logan et al. .......... 395/200.33 |
| 5,732,398 A | 3/1998 | Tagawa ........................ 705/5 |
| 5,737,393 A | 4/1998 | Wolf ....................... 379/88.13 |
| 5,740,429 A | 4/1998 | Wang et al. ............. 707/104.1 |
| 5,740,829 A | 4/1998 | Jacobs et al. ............. 137/15.08 |
| 5,742,775 A | 4/1998 | King ........................... 705/38 |
| 5,748,959 A | 5/1998 | Reynolds ..................... 709/106 |
| 5,751,790 A | 5/1998 | Makihata ..................... 379/71 |
| 5,751,806 A | 5/1998 | Ryan ......................... 380/237 |
| 5,754,858 A | 5/1998 | Broman et al. ............. 717/111 |
| 5,754,939 A * | 5/1998 | Herz et al. .................... 455/4.2 |
| 5,757,644 A | 5/1998 | Jorgensen et al. ........... 364/188 |
| 5,758,088 A | 5/1998 | Bezaire et al. .............. 709/232 |
| 5,758,351 A | 5/1998 | Gibson et al. ........... 707/104.1 |
| 5,761,432 A | 6/1998 | Bergholm et al. ........... 709/226 |
| 5,764,736 A * | 6/1998 | Shachar et al. .......... 379/93.09 |
| 5,765,028 A * | 6/1998 | Gladden ...................... 395/11 |
| 5,765,143 A | 6/1998 | Sheldon ....................... 705/28 |
| 5,771,172 A | 6/1998 | Yamamoto et al. ......... 700/106 |
| 5,771,276 A | 6/1998 | Wolf ....................... 379/88.16 |
| 5,781,735 A | 7/1998 | Southard ..................... 709/224 |
| 5,781,886 A | 7/1998 | Tsujiuchi .................... 704/275 |
| 5,787,151 A | 7/1998 | Nakatsu et al. .......... 379/88.23 |
| 5,787,278 A | 7/1998 | Barton et al. .................. 707/1 |
| H1743 H | 8/1998 | Graves et al. |
| 5,790,936 A | 8/1998 | Dinkins ..................... 455/3.05 |
| 5,793,980 A | 8/1998 | Glaser et al. ............... 709/231 |
| 5,794,246 A | 8/1998 | Sankaran et al. ........... 707/101 |
| 5,797,124 A | 8/1998 | Gardner et al. ............. 704/275 |
| 5,799,063 A | 8/1998 | Krane ..................... 379/88.17 |
| 5,799,156 A | 8/1998 | Hogan et al. ................ 709/237 |
| 5,802,488 A | 9/1998 | Edatsune ..................... 704/231 |
| 5,806,050 A | 9/1998 | Shinn et al. ................... 705/37 |
| 5,809,415 A | 9/1998 | Rossmann ................. 455/422 |
| 5,809,483 A | 9/1998 | Broka et al. .................. 705/37 |
| 5,812,987 A | 9/1998 | Luskin et al. ................. 705/36 |
| 5,819,220 A | 10/1998 | Sarukkai et al. ............ 704/243 |
| 5,819,293 A | 10/1998 | Comer et al. ............... 707/203 |
| 5,822,405 A | 10/1998 | Astarabadi ................ 379/88.04 |
| 5,825,856 A | 10/1998 | Porter et al. ............. 379/93.12 |
| 5,832,451 A | 11/1998 | Flake et al. .................... 705/5 |
| 5,838,252 A | 11/1998 | Kikinis ..................... 340/7.21 |
| 5,838,768 A | 11/1998 | Sumar et al. ............. 379/88.14 |
| 5,848,397 A | 12/1998 | Marsh et al. ................. 705/14 |
| 5,850,433 A * | 12/1998 | Rondeau ..................... 379/201 |
| 5,852,811 A | 12/1998 | Atkins ........................ 705/36 |
| 5,852,819 A | 12/1998 | Beller ........................... 707/1 |
| 5,854,746 A | 12/1998 | Yamamoto et al. ......... 700/106 |
| 5,857,191 A | 1/1999 | Blackwell, Jr. et al. ....... 707/10 |
| 5,864,605 A * | 1/1999 | Keshav ..................... 379/88.01 |
| 5,864,827 A | 1/1999 | Wilson ........................ 705/35 |
| 5,864,828 A | 1/1999 | Atkins ........................ 705/36 |
| 5,867,153 A | 2/1999 | Grandcolas et al. ........... 705/39 |
| 5,870,454 A | 2/1999 | Dahlen .................... 379/88.14 |
| 5,870,724 A | 2/1999 | Carmody et al. ............. 705/42 |
| 5,870,746 A | 2/1999 | Knutson et al. ............ 707/101 |
| 5,872,921 A | 2/1999 | Zahariev et al. ............ 709/203 |
| 5,872,926 A | 2/1999 | Kuecherer et al. .......... 709/206 |
| 5,878,403 A | 3/1999 | Agrawal et al. .............. 705/38 |
| 5,880,726 A | 3/1999 | Takiguchi et al. .......... 345/781 |
| 5,884,262 A * | 3/1999 | Wise et al. ................. 704/270 |
| 5,884,266 A | 3/1999 | Dvorak ..................... 704/275 |
| 5,884,285 A | 3/1999 | Atkins ........................ 705/36 |
| 5,884,312 A * | 3/1999 | Dustan et al. ................ 707/10 |
| 5,890,140 A | 3/1999 | Clark et al. ................... 705/35 |
| 5,893,079 A | 4/1999 | Cwenar ...................... 705/36 |
| 5,893,905 A * | 4/1999 | Main et al. .................... 705/11 |
| 5,907,598 A | 5/1999 | Mansey et al. ......... 379/100.01 |
| 5,907,837 A | 5/1999 | Ferrel et al. .................... 707/3 |
| 5,911,135 A | 6/1999 | Atkins ........................ 705/36 |
| 5,911,136 A | 6/1999 | Atkins ........................ 705/36 |
| 5,913,195 A | 6/1999 | Weeren et al. .............. 704/270 |
| 5,913,202 A | 6/1999 | Motoyama ................... 705/35 |
| 5,914,878 A | 6/1999 | Yamamoto et al. ......... 700/106 |
| 5,915,001 A | 6/1999 | Uppaluru .................. 379/88.22 |

| Patent No. | | Date | Inventor(s) | Class |
|---|---|---|---|---|
| 5,915,238 | A | 6/1999 | Tjaden | 704/260 |
| 5,918,213 | A | 6/1999 | Bernard et al. | 705/26 |
| 5,918,217 | A | 6/1999 | Maggioncalda et al. | 705/36 |
| 5,918,225 | A | 6/1999 | White et al. | 707/3 |
| 5,918,232 | A * | 6/1999 | Pouschine et al. | 707/103 |
| 5,920,848 | A | 7/1999 | Schutzer et al. | 705/42 |
| 5,923,736 | A | 7/1999 | Shachar | 379/93.17 |
| 5,924,068 | A | 7/1999 | Hanson et al. | 704/260 |
| 5,926,789 | A | 7/1999 | Barbara et al. | 704/275 |
| 5,931,900 | A | 8/1999 | Notani et al. | 705/36 |
| 5,933,816 | A | 8/1999 | Zeanah et al. | 705/35 |
| 5,940,818 | A * | 8/1999 | Malloy et al. | 707/2 |
| 5,943,395 | A | 8/1999 | Hansen | 379/52 |
| 5,943,399 | A | 8/1999 | Fink et al. | 379/88.17 |
| 5,943,410 | A | 8/1999 | Thomas et al. | 379/213.01 |
| 5,943,677 | A | 8/1999 | Hicks | 707/205 |
| 5,945,989 | A | 8/1999 | Freishtat et al. | 345/760 |
| 5,946,485 | A | 8/1999 | Weeren et al. | 717/109 |
| 5,946,666 | A | 8/1999 | Nevo et al. | 705/36 |
| 5,946,711 | A | 8/1999 | Donnelly | 709/201 |
| 5,948,040 | A | 9/1999 | DeLorme et al. | 701/201 |
| 5,950,165 | A | 9/1999 | Shaffer et al. | 704/270 |
| 5,953,392 | A * | 9/1999 | Rhie et al. | 379/88.13 |
| 5,953,406 | A | 9/1999 | LaRue et al. | 379/265 |
| 5,956,693 | A * | 9/1999 | Geerlings | 705/14 |
| 5,960,437 | A | 9/1999 | Krawchuk et al. | 711/152 |
| 5,963,641 | A | 10/1999 | Crandall et al. | 380/2 |
| 5,970,122 | A | 10/1999 | LaPorta et al. | 340/7.23 |
| 5,970,124 | A | 10/1999 | Csaszar et al. | 379/88.18 |
| 5,974,398 | A | 10/1999 | Hanson et al. | 705/1 |
| 5,974,406 | A | 10/1999 | Bisdikian et al. | 707/1 |
| 5,974,441 | A * | 10/1999 | Rogers et al. | 709/200 |
| 5,978,766 | A | 11/1999 | Luciw | 705/1 |
| 5,978,796 | A | 11/1999 | Malloy et al. | 707/3 |
| 5,983,184 | A | 11/1999 | Noguchi | 704/270 |
| 5,987,586 | A | 11/1999 | Byers | 712/11 |
| 5,991,365 | A | 11/1999 | Pizano et al. | 379/88.13 |
| 5,995,945 | A | 11/1999 | Notani et al. | 705/28 |
| 5,996,006 | A | 11/1999 | Speicher | 709/218 |
| 5,999,526 | A | 12/1999 | Garland et al. | 370/352 |
| 6,003,009 | A | 12/1999 | Nishimura | 705/5 |
| 6,006,225 | A | 12/1999 | Bowman et al. | 707/5 |
| 6,009,383 | A | 12/1999 | Mony | 704/200 |
| 6,011,579 | A | 1/2000 | Newlin | 348/14.08 |
| 6,012,066 | A | 1/2000 | Discount et al. | 707/103 R |
| 6,012,083 | A * | 1/2000 | Savitzky et al. | 709/202 |
| 6,014,427 | A | 1/2000 | Hanson et al. | 379/67.1 |
| 6,014,428 | A | 1/2000 | Wolf | 379/88.11 |
| 6,014,429 | A | 1/2000 | LaPorta et al. | 379/88.15 |
| 6,016,335 | A | 1/2000 | Lacy et al. | 379/67.1 |
| 6,016,336 | A | 1/2000 | Hanson | 379/88.13 |
| 6,016,478 | A | 1/2000 | Zhang et al. | 705/9 |
| 6,018,710 | A | 1/2000 | Wynblatt et al. | 704/260 |
| 6,018,715 | A | 1/2000 | Lynch et al. | 705/5 |
| 6,021,181 | A | 2/2000 | Miner et al. | 379/88.23 |
| 6,021,397 | A | 2/2000 | Jones et al. | 705/36 |
| 6,023,714 | A | 2/2000 | Hill et al. | 707/513 |
| 6,026,087 | A | 2/2000 | Sponaugle et al. | 370/389 |
| 6,029,195 | A | 2/2000 | Herz | 709/219 |
| 6,031,836 | A * | 2/2000 | Haserodt | 370/389 |
| 6,038,561 | A * | 3/2000 | Snyder et al. | 707/6 |
| 6,044,134 | A | 3/2000 | De La Huerga | 379/88.08 |
| 6,047,327 | A | 4/2000 | Tso et al. | 709/232 |
| 6,055,513 | A | 4/2000 | Katz et al. | 705/26 |
| 6,055,514 | A | 4/2000 | Wren | 705/26 |
| 6,058,166 | A | 5/2000 | Osder et al. | 379/88.22 |
| 6,061,433 | A * | 5/2000 | Polcyn et al. | 379/93.12 |
| 6,064,980 | A | 5/2000 | Jacobi et al. | 705/26 |
| 6,067,348 | A | 5/2000 | Hibbeler | 379/88.16 |
| 6,067,535 | A | 5/2000 | Hobson et al. | 706/10 |
| 6,078,924 | A | 6/2000 | Ainsbury et al. | 707/101 |
| 6,078,994 | A | 6/2000 | Carey | 711/133 |
| 6,081,815 | A | 6/2000 | Spitznagel et al. | 707/501 |
| 6,094,651 | A | 7/2000 | Agrawal et al. | 707/5 |
| 6,094,655 | A * | 7/2000 | Rogers et al. | 707/10 |
| 6,101,241 | A | 8/2000 | Boyce et al. | 379/88.01 |
| 6,101,443 | A | 8/2000 | Kato et al. | 701/210 |
| 6,101,473 | A * | 8/2000 | Scott et al. | 704/275 |
| 6,108,686 | A | 8/2000 | Williams, Jr. | 709/202 |
| 6,115,686 | A | 9/2000 | Chung et al. | 704/260 |
| 6,115,693 | A | 9/2000 | McDonough et al. | 705/10 |
| 6,119,095 | A | 9/2000 | Morita | 705/5 |
| 6,122,628 | A | 9/2000 | Castelli et al. | 707/5 |
| 6,122,636 | A | 9/2000 | Malloy et al. | 707/102 |
| 6,131,184 | A | 10/2000 | Weeren et al. | 717/109 |
| 6,134,563 | A | 10/2000 | Clancey et al. | 715/503 |
| 6,151,582 | A | 11/2000 | Huang et al. | 705/8 |
| 6,151,601 | A | 11/2000 | Papierniak et al. | 707/10 |
| 6,154,527 | A | 11/2000 | Porter et al. | 379/88.18 |
| 6,154,766 | A * | 11/2000 | Yost et al. | 709/201 |
| 6,157,705 | A | 12/2000 | Perrone | 379/88.01 |
| 6,163,774 | A | 12/2000 | Lore et al. | 707/2 |
| 6,167,379 | A | 12/2000 | Dean et al. | 705/9 |
| 6,167,383 | A | 12/2000 | Henson | 705/26 |
| 6,173,266 | B1 | 1/2001 | Marx et al. | 704/270 |
| 6,173,310 | B1 * | 1/2001 | Yost et al. | 709/201 |
| 6,173,316 | B1 | 1/2001 | De Boor et al. | 709/218 |
| 6,181,935 | B1 | 1/2001 | Gossman et al. | 324/765 |
| 6,182,052 | B1 * | 1/2001 | Fulton et al. | 705/26 |
| 6,182,053 | B1 | 1/2001 | Rauber et al. | 705/28 |
| 6,182,153 | B1 | 1/2001 | Hollberg et al. | 455/433 |
| 6,185,558 | B1 | 2/2001 | Bowman et al. | 707/5 |
| 6,189,008 | B1 | 2/2001 | Easty et al. | 707/10 |
| 6,199,082 | B1 * | 3/2001 | Ferrel et al. | 707/522 |
| 6,201,948 | B1 | 3/2001 | Cook et al. | 434/350 |
| 6,203,192 | B1 | 3/2001 | Fortman | 379/88.14 |
| 6,215,858 | B1 | 4/2001 | Bartholomew et al. | 379/88.17 |
| 6,219,643 | B1 | 4/2001 | Cohen et al. | 704/257 |
| 6,223,983 | B1 * | 5/2001 | Kjonaas et al. | 235/379 |
| 6,233,609 | B1 | 5/2001 | Mittal | 709/219 |
| 6,236,977 | B1 | 5/2001 | Verba et al. | 705/10 |
| 6,240,391 | B1 * | 5/2001 | Ball et al. | 704/270 |
| 6,243,092 | B1 * | 6/2001 | Okita et al. | 345/866 |
| 6,243,445 | B1 | 6/2001 | Begeja et al. | 379/93.01 |
| 6,246,981 | B1 | 6/2001 | Papineni et al. | 707/235 |
| 6,253,146 | B1 | 6/2001 | Hanson et al. | 701/202 |
| 6,256,659 | B1 | 7/2001 | McLain, Jr. et al. | 709/100 |
| 6,260,050 | B1 * | 7/2001 | Yost et al. | 707/501 |
| 6,263,051 | B1 * | 7/2001 | Saylor et al. | |
| 6,269,336 | B1 | 7/2001 | Ladd et al. | 704/270 |
| 6,269,393 | B1 * | 7/2001 | Yost et al. | 709/201 |
| 6,279,033 | B1 | 8/2001 | Selvarajan et al. | 709/215 |
| 6,279,038 | B1 | 8/2001 | Hogan et al. | 709/24 |
| 6,286,030 | B1 * | 9/2001 | Wenig et al. | 709/203 |
| 6,289,352 | B1 | 9/2001 | Proctor | 707/102 |
| 6,292,811 | B1 | 9/2001 | Clancey et al. | 715/503 |
| 6,301,590 | B1 | 10/2001 | Siow et al. | 715/500 |
| 6,304,850 | B1 | 10/2001 | Keller et al. | 705/5 |
| 6,313,734 | B1 * | 11/2001 | Weiss et al. | 340/7.29 |
| 6,314,402 | B1 | 11/2001 | Monaco et al. | 704/275 |
| 6,314,533 | B1 | 11/2001 | Novik et al. | 714/39 |
| 6,317,750 | B1 | 11/2001 | Tortolani et al. | 707/103.14 |
| 6,321,190 | B1 * | 11/2001 | Bernardes et al. | 704/18 |
| 6,321,198 | B1 | 11/2001 | Hank et al. | 704/270 |
| 6,321,221 | B1 | 11/2001 | Bieganski | 707/5 |
| 6,327,343 | B1 * | 12/2001 | Epstein et al. | 379/88.01 |
| 6,336,124 | B1 | 1/2002 | Alam et al. | 715/523 |
| 6,341,271 | B1 | 1/2002 | Salvo et al. | 705/28 |
| 6,360,139 | B1 | 3/2002 | Jacobs | 700/232 |
| 6,363,393 | B1 * | 3/2002 | Ribitzky | 707/102 |

| | | | | |
|---|---|---|---|---|
| 6,366,298 | B1 | | 4/2002 | Haitsuka et al. ............ 345/736 |
| 6,385,191 | B1 | * | 5/2002 | Coffman et al. ............ 370/352 |
| 6,385,301 | B1 | * | 5/2002 | Nolting et al. ........... 379/32.01 |
| 6,385,583 | B1 | | 5/2002 | Ladd et al. ..................... 705/28 |
| 6,389,398 | B1 | * | 5/2002 | Lustgarten et al. ......... 704/275 |
| 6,397,387 | B1 | * | 5/2002 | Rosin et al. .................. 725/44 |
| 6,404,858 | B1 | | 6/2002 | Farris et al. ............. 379/88.02 |
| 6,404,877 | B1 | | 6/2002 | Bolduc et al. ......... 379/218.01 |
| 6,405,171 | B1 | * | 6/2002 | Kelley ........................ 704/270 |
| 6,412,012 | B1 | | 6/2002 | Bieganski et al. .......... 709/232 |
| 6,438,217 | B1 | * | 8/2002 | Huna ...................... 379/88.14 |
| 6,442,560 | B1 | | 8/2002 | Berger et al. ............... 707/102 |
| 6,456,699 | B1 | | 9/2002 | Burg et al. .............. 379/88.17 |
| 6,459,774 | B1 | * | 10/2002 | Ball et al. .................. 379/67.1 |
| 6,473,612 | B1 | * | 10/2002 | Cox et al. ................ 455/414.2 |
| 6,477,549 | B1 | | 11/2002 | Hishida et al. ............. 705/513 |
| 6,480,842 | B1 | | 11/2002 | Agassi et al. .................. 707/4 |
| 6,487,277 | B2 | * | 11/2002 | Beyda et al. ............ 379/88.01 |
| 6,487,533 | B2 | * | 11/2002 | Hyde-Thomson et al. .. 704/260 |
| 6,490,593 | B2 | * | 12/2002 | Proctor ....................... 707/102 |
| 6,493,685 | B1 | | 12/2002 | Ensel et al. ................... 705/40 |
| 6,496,568 | B1 | | 12/2002 | Nelson .................... 379/88.12 |
| 6,501,832 | B1 | | 12/2002 | Saylor et al. ............ 379/88.04 |
| 6,507,817 | B1 | * | 1/2003 | Wolfe et al. ................. 704/260 |
| 6,513,019 | B2 | * | 1/2003 | Lewis .......................... 705/35 |
| 6,539,359 | B1 | * | 3/2003 | Ladd et al. .................. 704/275 |
| 6,549,612 | B2 | * | 4/2003 | Gifford et al. ............. 379/67.1 |
| 6,567,796 | B1 | | 5/2003 | Yost et al. ..................... 707/2 |
| 6,578,000 | B1 | * | 6/2003 | Dodrill et al. .............. 704/270 |
| 6,587,547 | B1 | * | 7/2003 | Zirngibl et al. .......... 379/88.17 |
| 6,606,596 | B1 | * | 8/2003 | Zirngibl et al. ............. 704/270 |
| 6,658,093 | B1 | | 12/2003 | Langseth et al. ........ 379/88.17 |
| 6,658,432 | B1 | | 12/2003 | Alavi et al. .............. 707/104.1 |
| 2001/0012335 | A1 | * | 8/2001 | Kaufman et al. |
| 2002/0006126 | A1 | | 1/2002 | Johnson et al. ............. 370/356 |
| 2002/0065752 | A1 | | 5/2002 | Lewis |

OTHER PUBLICATIONS

MSTR006—Catalano, Carla, *"OLAP, Scheduling, Tuning for DBMSs,"* Computer World, Apr. 1, 1996. Available in Dow Jones Interactive, http://www.dowjonesinteractive.com.

MSTR007—*Andyne's Intranet Strategy Brings DSS to the Web; Company Aims to Dramatically Broaden Scope of Reporting, Online Analysis,* PR Newswire, Sep. 18, 1996. Available from the Dow Jones Interactive Web Site http://Ptg.djnr.com.

MSTR008—Sachs et al., *"A First Step on the Path to Automated Flight Reservations,"* Interactive Voice Technology for Telecommunications, 1996.

MSTR009—Bennacef et al., *"Dialog in the RAILTEL Telephone–Based System,"* Spoken Language, 1996.

MSTR010—Brooks, Peter, *"Targeting Customer,"* DBMS, v9, n13, Dec. 1996, pp. 54–58.

MSTR011—*"Sterling Software Announces Alliance with Thinking Machines,"* Business Wire, Dec. 16, 1996. Available from the Dow Jones Interactive Web Site http://Ptg.djnr.com.

MSTR012—Gupta et al., *"Index Selection for OLAP,"* Proceedings of the 13th International Conference on Data Engineering, ©1997.

MSTR013—Ho et al., *"Partial–Sum Queries in OLAP Data Cubes Using Covering Codes,"* PODS'97 Tucson, AZ USA.

MSTR014—Kilmartin et al., *"Real Time Stock Price Distribution Utilising the GSM Short Messaging Service,"* 1997 IEEE International Conference on Personal Wireless, 1997, Abstract.

MSTR015—*Data Warehousing: Data Access and Delivery,* Infobase Technology Database, 1997, http://www.dbaint.com/oldinfobase/dwaccdel.html.

MSTR016—Gardner, Dana Marie, *"Cashing in With Data Warehouse and the Web,"* Data Based Advisor, v15, n2, Feb. 1997, pp. 60–63.

MSTR017—*Intrepid Systems Announces General Availability of DecisionMaster 4.1; Retailing's Premier Decision Support Software Enhancements Automate Information Delivery,* Business Wire, May 27, 1997. Available in Dow Jones Interactive, http://www.dowjonesinteractive.com.

MSTR018—*Blue Isle Software InTouch/2000 Product Overview,* Blue Isle Software, Inc. (archived Jul. 7, 1997), http://www.blueisle.com. Available in Internet Archive Waybackmachine http://www.archive.org.

MSTR019—*"Blue Isle Software Teams with Arbor Software to Deliver Automated Systems Management Capabilities for Arbor Essbase,"* Business Wire, Oct. 29, 1997. Available in LEXIS, Nexis Library, ALLNWS file.

MSTR020—*"Early Warning: Compulogic's Dynamic Query Messenger,"* Software Futures, Nov. 1, 1997. Available in LEXIS, Nexis Library, ALLNWS file.

MSTR021—Kilmartin et al., "Development of an Interactive Voice Response System for a GSM SMS Based Share Price Server," DSP '97 Conference Proceedings, Dec. 1997, Abstract.

MSTR022—Avnur et al., *"CONTROL: Continuous Output and Navigation Technology with Refinement On–Line,"* © 1998.

MSTR023—Liang et al., *"Computing Multidimensional Aggregates in Parallel,"* 1998 International Conference on Parallel and Distributing Systems, IEEE.

MSTR024—Friel et al., *An Automated Stock Price Delivery System Based on the GSM Short Message Service,* ICC'98 1998 IEEE International Conference on Communications, 1998, Abstract.

MSTR025—Microstrategy Products and Services, 1998.

MSTR026—Personalized Information Broadcast Server, 1998.

MSTR027— *"Information Advantage Wins Product of the Year Award for Knowledge Management,"* Business Wire, Mar. 4, 1998. Available in LEXIS, Nexis Library. ALLNWS file.

MSTR028—EMIGH, Jacqueline, *"Information Builders, Inc. Launches WebFocus Suit,"* Newbytes, Mar. 10, 1998. Available in Northern Light, http://www.northernlight.com.

MSTR029—*Microstrategy: DSS Broadcaster—The Industry's First Information Broadcast Server,* M2 Presswire, Mar. 20, 1998. Available in Dow Jones Interactive http://www.djinteractive.com.

MSTR030—*Microstrategy Introduces DSS Broadcaster—The Industry's First Information Broadcast Server,* Mar. 23, 1998. http://strategy.com/newsandevent/New/PressRelease/1998/broadcaster.htm.

MSTR031—*Microstrategy Introduces DSS Broadcaster—The Industry's First Information Broadcast Server,* Mar. 23, 1998. http://www.strategy.com/newsandevents/News/PressReleases/1998/broadcaster.htm.

MSTR033—Prospectus—4,000,000 Shares Microstrategy Class A Common Stock, Jun. 11, 1998.

MSTR035—Relational OLAP Interface, Programmer's Reference and SDK Guide, Version 5.0, Aug. 1998.

MSTR036—Data Warehouse Dossier, Fall 1998.

MSTR037—"*Microstrategy Announces Enhanced Versions of DSS Web and DSS Server*," http://www.strategy.com/NewsandEvents/news/pressreleases/1998/server5.5.htm.

MSTR038—System Guide DSS Web Version 5.5, Feb. 1999.

MSTR039—Developer Guide DSS Web Version 5.5, Feb. 1999.

MSTR040—Media Output Book, v2.0, Feb. 16, 1999.

MSTR041—*Computer Telephony*, from www.telecomlibrary.com—Sep. 9, 1999.

MSTR042—Frequently Asked Questions About DSS Web, printed Feb. 23, 1999, http://www.strategy.com/products/Web/faq.htm.

MSTR045—Newswire, "Net Phones to Outsell Laptops by 2002", Dec. 2, 1998, Dialog File #03635692.

MSTR046—RCR Radio Communications Report, "Comverse Developing Unified Applications for GSM Smartphone Marketplace", Feb. 23, 1998, V. 17, No. 8, p. 106, Dialog File #02078693.

MSTR047—America's Network, "Wireless Web Browsing: How Long Will Deployment Take? (There Will be 22 Mil Devices Other than PCs Accessing the Internet by 2000)", Dec. 15, 1996, vol. 100, No. 24, p. 30+, Dialog File #01708089.

MSTR048—Adali et al., "Query Caching and Optimization in Distributed Mediator Systems", SIGMOD '96, 6/96, Montreal, Canada, pp. 137–148.

MSTR049—Alur et al., "Directory–Driven Information Delivery", DataBase Associates Int'l, Jul. 1996, printed from http://web.archive.org on Jan. 7, 2002, 12 pages.

MSTR050—Chawathe et al., "Representing and Querying Changes in Semistructured Data", Proceedings of the $14^{th}$ International Conference on Data Engineering, IEEE, Feb. 23–27, 1998, pp. 4–13.

MSTR051—Codd et al., "Providing OLAP (On–line Analytical Processing) to User–Analysts; an IT Mandate", San Jose, California, Codd and Date, 1993, 1 page.

MSTR052—Flohr, "Using Web–Based Applications to Perform On–Line Analytical Processing Builds on the Strengths of Both Technologies", *OLAP by Web*, Sep. 1997, 8 pages.

MSTR053—Gesmann et al., "A Remote Cooperation System Supporting Interoperability in Heterogeneous Environments", Proceedings of the Third International Workshop on Research Issued in Data Engineering, IEEE, Apr. 19–20, 1993, pp. 152–160.

MSTR054—Hackathorn, "Solutions to Overworked Networks and Unruly Software Distribution are Just Part of P&S.", *Publish or Perish*, Sep. 1997, 21 pages.

MSTR055—Liscano et al., "Intergrating Multi–Modal Messages across Heterogeneous Networks", IEEE, 1997, pp. 45–53, Abstract.

MSTR056—Liu et al., "Differential Evaluation of Continual Queries", Proceedings of the $16^{th}$ International Conference on Distributed Computing Systems, IEEE, May 27–30, 1996, pp. 458–465.

MSTR057—Newing, "Relational Databases Are Not Suitable for Management Information Systems: And That's Official!", *Management Accounting*, London, vol. 72, No. 8, Sep. 1994, 4 pages.

MSTR058—Raden, "Teraforming the Data Warehouse", Archer Decision Sciences, printed from http://www.archer–decision.com on Jan. 16, 2002, 13 pages.

MSTR059—Schreier et al., Alert: An Architecture for Transforming a Passive DBMS into an Active DBMS, Proceedings of the $17^{th}$ International Conference on Very Large Data Bases, Sep. 3–6, 1991, pp. 469–478.

MSTR060—Schultz, "ADEPT—The Advanced Database Environment for Planning and Tracking", *Bell Labs Technical Journal*, Jul. –Sep. 1998, pp. 3–9.

MSTR061—Spofford, "Attack of the Killer APIs", Intelligent Enterprise's Database Online Programming and Design, printed from http://www.dbpd.com on Dec. 21, 2001, 10 pages.

MSTR062—Stonebraker et al., "On Rules, Procedures, Caching and Views in Data Base Systems", Proceedings of the 1990 ACM SIGMOD International Conference on Management of Data, May 23–25, 1990, pp. 281–290.

MSTR063—Terry et al., "Continuous Queries over Append–Only Databases", Proceedings of the 1992 ACM SIGMOD International Conference on Management of Data, Jun. 2–5, 1992, pp. 321–330.

MSTR064—Search Results from Internet Archive Wayback Machine, searched for http://www.infoadvan.com, printed from http://web.archive.org on Dec. 19, 2001, 40 pages.

MSTR065—Search Results from Internet Archive Wayback Machine, searched for http://www.platinum.com, printed from http://web.archive.org on Dec. 21, 2001, 17 pages.

MSTR066—ROLAP Case Studies, 30 pages.

MSTR067—"Fast and Flexible Access to Databases", *Byte*, Aug. 1997, pp. 53–54.

MSTR068—"Distributed Application Development with PowerBuilder 6.0", Manning Publications Co., printed from http://www.manning.com on Jan. 15, 2002, 12 pages.

MSTR069—"PowerBuilder 6.0 Questions & Answers", Manning Publications Co., printed from http://www.manning.com on Jan. 15, 2002, 13 pages.

MSTR070—"PowerBuilder 6.0 Questions & Answers", Manning Publications Co., printed from http://www.manning.com on Jan. 17, 2002, 2 pages.

MSTR071—Cheshire, "Product News—A Sea of Opportunity", Intelligent Enterprise's Database Online Programming and Design, printed from http://www.dbpd.com on Jan. 17, 2002, 6 pages.

MSTR072—"Information Advantage—Business Intelligence", "Live Information Respository . . . ", printed from http://www.infoadvan.com, on Dec. 19, 2001, 5 pages.

MSTR073—"Objective Data Inc.—Computer Software Consultants", Client List, printed from http://objectivedata.com/clients.htm on Jan. 15, 2002, 5 pages.

MSTR074—"Online Analytical Processing", printed from http://searchdatabase.techtarget.com on Jan. 18, 2002, 3 pages.

MSTR075—"Seagate Crystal Reports 8", printed from http://www.crystaluser.com on Dec. 28, 2001, 6 pages.

MSTR076—"Andyne Delivers Personal OLAP with PaBLO 4.0", Press Release, Mar. 31, 1997, Andyne Computing Limited, 5 pages.

MSTR077—"Andyne Announces Support for Microsoft's OLE DB for OLAP", Press Release, Sep. 10, 1997, Andyne Computing Limited, 4 pages.

MSTR078—"Andyne QMO—Manage Data Access", Andyne Computing, printed from http://web.archive.org on Jan. 3, 2002, 5 pages.

MSTR079—"The Andyne Vision—On the Road to the Integrated Solution", Andyne Computing, printed from http://web.archive.org on Jan. 3, 2002, 11 pages.

MSTR080—"Visual Information Access for Multidimensional Companies . . . ", Andyne Corporate Profile, 2 pages.

MSTR081—"MicroStrategy Announces DSS Web 5.0; DSS Web Introduces the Web–Cast of Decision Support", MicroStrategy, Jan. 5, 1998, printed Dec. 10, 2001, 2 pages.

MSTR082—"MicroStrategy Introduces DSS Web Standard Edition; Web Interface Provides powerful, Easy–to–Use DSS Tool for Mainstream End–User Market", MicroStrategy, Apr. 27, 1998, printed Dec. 10, 2001, 2 pages.

MSTR083—"MicroStrategy Advantages: Proven Multi–Tier Architecture", printed from http://web.archive.org, 4 pages.

MSTR084—"MicroStrategy 'Consumerizes' the Data Warehouse with Its New 4.0 Product Line", Press Release, Jun. 24, 1996, MicroStrategy, printed from http://web.archive.org on Dec. 8, 2001, 7 pages.

MSTR085—"MicroStrategy Announces DSS Server 3.0", Press Release, Aug. 8, 1995, MicroStrategy, printed from http://web.archive.org on Dec. 8, 2001, 5 pages.

MSTR086—"MicroStrategy Announces True Relational OLAP Product Line", Press Release, Aug. 8, 1995, MicroStrategy, printed from http://web.archive.org on Dec. 8, 2001, 5 pages.

MSTR087—"DSS Administrator Features Overview", MicroStrategy, No. 05090297, 2 pages.

MSTR088—"DSS Agent Features Overview", MicroStrategy, No. 05100896, 2 pages.

MSTR089—"DSS Server Features Overview", MicroStrategy, No. 05140896, 2 pages.

MSTR090—"Relational OLAP Interface", DSS Agent, MicroStrategy, 22 pages and 20 pages.

MSTR091—"Relational OLAP Interface for the Web", MicroStrategy DSS Web Brochure, 4 pages.

MSTR092—"Data Warehouse and DSS Management Tools", DSS Administrator, MicroStrategy, 17 pages and 16 pages.

MSTR093—"OLE API for Custom Application Development", DSS Objects, MicroStrategy, 4 pages and 4 pages.

MSTR094—"Arbor Software OLAP Products", Brochure, Arbor Software, 12 pages.

MSTR095—"InfoTrac OneFile", *Database Programming & Design*, vol. 11, No. 7, Jul. 1998, 12 pages.

MSTR096—"Andyne GQL Version 3.3.2 Available Jul. 17$^{th}$; Featuring Multi–Pass Reporting, Time Governors and Scripting", *Business Wire*, Jun. 26, 1995, Andyne Computing Limited, 4 pages.

MSTR097—"MicroStrategy Announces DSS Server 3.0; Three–Tier Architecture Results in Exceptional Performance and Scalability for DSS Applications", *Business Wire*, Aug. 8, 1995, MicroStrategy, 3 pages.

MSTR098—"Information Advantage Ships DecisionSuite 3.0 Business Analysis Applications for Data Warehouse", *Business Wire*, Nov. 9, 1995, 3 pages.

MSTR099—"Information Advantage Announces WebOLAP; First Structured Content analysis Server for the World Wide Web", *Business Wire*, Feb. 5, 1996, 3 pages.

MSTR100—"Andyne Delivers Second State of the Andyne Intergrated Solution", *Canada NewsWire*, May 13, 1996, 3 pages.

MSTR101—"Andyne Computing Ltd is Shipping Version 3.3.2 of Its GQL Decision Support System", *CommunicationsWeek*, No. 566, Jul. 17, 1995, p. 16.

MSTR102—"Andyne Computing Introduces New Query Management Option as Companion Product to Andyne's GQL Product", *CommunicationsWeek*, No. 592, Jan. 15, 1996, p. 16.

MSTR103—"Andyne Hopes to Benefit from Current Data Wahehousing Hype with GQL Query Language", *Computergram International*, No. 2798, Nov. 22, 1995, 1 page.

MSTR104—"Andyne's GQL Makes It Easier—New Version of Reporting, Analysis Tool Unveiled", *Computer Reseller News*, No. 685, 1996, p. 79.

MSTR105—"The Right Tools", *Computer Weekly*, Aug. 29, 1996, 4 pages.

MSTR106—"4 OLAP Tools; The Common Thread is that OLAP Tools Drain Too Much Time and Energy Before You Get What You Need", *Computerworld*, Dec. 2, 1996, 4 pages.

MSTR107—"GQL", *Data Management Review (DM Review)*, vol. 6, No. 5, May 1996, p. 47.

MSTR108—"DB2 Today Newsletter", Jun. 1999, 2 pages.

MSTR109—"GQL 3.2", *DBMS*, vol. 8, No. 1, Jan. 1995, 2 pages.

MSTR110—"Everything's Coming Up Warehouse", *DBMS*, Oct. 1, 1995, 3 pages.

MSTR111—"Query, Reporting, and Analysis Tools", *DBMS*, vol. 9, No. 6, Jun. 15, 1996, 14 pages.

MSTR112—Brooks, "MCI Leverages Data Warehouse Technology to Strengthen its Marketing Campaigns", *DBMS*, Dec. 1996, 7 pages.

MSTR113—Dobson, "Data Binding in Dynamic HTML", *DBMS*, Mar. 1998, 12 pages.

MSTR114—Dodd, "Native is as Native Does", *HP Professional*, vol. 12, No. 12, Feb. 1998, 1 page.

MSTR115—"Banking's New Payoff: Speed", *InformationWeek*, Jan. 17, 1994, 3 pages.

MSTR116—"Nailing Down More Query Tools", *InformationWeek*, vol. 523, Apr. 17, 1995, 7 pages.

MSTR117—Raden, "Data, Data Everywhere", *Information Week*, Oct. 30, 1995, pp. 60–65.

MSTR118—"Back–to–Back Upgrades—Vendors Introduce Reporting, Query Tools", *InformationWeek*, No. 598, Sep. 23, 1996, 1 page.

MSTR119—"Desktop OLAP Tools—If the Tool Fits, Use It—Online Analytical Processing Tools Offer Ease of Use for Data Retrieval and Analysis with Minimal User Training", *InformationWeek*, No. 605, Nov. 11, 1996, 3 pages.

MSTR120—"Pilot Gets Serious About OLAP", *Information Week*, Jul. 20, 1998, pp. 55–59.

MSTR121—"Oracle Announces Next Generation Oracle Express Server 6.0", *M2 Presswire*, Aug. 7, 1996, 5 pages.

MSTR122—"Andyne Updates GQL", *Newsbytes*, Jul. 12, 1994, 1 page.

MSTR123—"Andyne Computing Has Released Version 3.2.2 of Its GQL Query Software for Macintosh, Windows and Unix Platforms", *Newsbytes News Network*, Jul. 12, 1994, 4 pages.

MSTR124—"Data Access is Key to Warehousing Success", *Open Systems Today*, Oct. 3, 1994, 2 pages.

MSTR125—Phillips, "Crystal Eyes OLAP Engine", *PC Week*, vol. 13, No. 4, Jan. 29, 1996, 3 pages.

MSTR126—Dyck, "New Report Writer Spruces Up GQL", *PC Week*, vol. 14, No. 3, Jan. 20, 1997, 1 page.
MSTR127—"New Decision Suite 3.0 From Information Advantage Raises the Bar for Enterprise Decision Support", *Newswire*, Aug. 8, 1995, 3 pages.
MSTR128—"Andyne's Intranet Strategy Brings DSS to the Web; Company Aims to Dramatically Broaden Scope of Reporting, Online Analysis", *PR Newswire*, Sep. 18, 1996, 11 pages.
MSTR129—"NCR Adds OLAP Services to Extend and Expand Decision Support Capabilities of Teradata Database", *PR Newswire*, May 28, 1998, 3 pages.
MSTR130—"DecisionSuite 3.5", *SoftBase*, Sep. 12, 1996, 2 pages.
MSTR131—"IBM Acquires ITI's KnowledgeX Technology to Enhance Business Intelligence Solutions", *Software News*, Jul. 23, 1998, 1 page.
MSTR132—"Microstrategy Talks Crystal Balls", *Software Futures*, Apr. 1, 1997, 4 pages.
MSTR133—"Document Agent Administrator's Guide", Revision 3, BusinessObjects, Version 4.0, pp. 1–29.
MSTR134—"Document Agent Server Administrator's Guide", Revision 4, BusinessObjects, Version 4.1, pp. 1–33.
MSTR135—"Getting Started with Reports", Revision 2, BusinessObjects, Version 4.0, pp. 1–53.
MSTR136—"Getting Started with Reports", Revision, 3, BusinessObjects, Version 4.1, pp. 1–53.
MSTR137—"User's Guide", Revision 3, BusinessObjects, Version 4.0, pp. 1–251.
MSTR138—"User's Guide", Revision 4, BusinessObjects, Version 4.1, pp. 1–287.
MSTR139—"United EasyUpdate", United Airlines, printed from http://www.ual.com/page/article/0,1360,1974,00.html, printed Nov. 30, 2002, 4 pages.
MSTR140—General Magic, Inc. website, printed from http://www.genmagic.com, printed Nov. 30, 2002, 16 pages.
Traffic Station Corporate Information, http://www.trafficstation.com/home/corporate.html, Jan. 10, 2001.
Traffic Station Extends Service to Six New Markets in North America, Reaching its Goal of 20 Markets by the New Millennium, Business Editors/Multimedia & Transportation Writers, Los Angeles, Dec. 23, 1999.
MSNBC on the Internet Launches New Traffic Section; MSNBC.com and Sidewalk.com Team with TrafficStation for Production of Comprehensive Site for Drivers, Financial News, Redmond, Wash, Apr. 15, 1998.

MSTR142—Lehner, Wolfgang, "Modeling Large Scale OLAP Scenarios", University of Erlangen–Nuremberg, Dept. of Database Systems, Germany, 1998, pp. 1–15.
MSTR143—"Sybase Announces General Availability of Warehouse Studio", *PR Newswire*, New York, Jun. 23, 1998, two pages.
MSTR144—Schmandt, Chris, "Phoneshell: the Telephone as Computer Terminal", *Proceedings of ACM Multimedia '93*, New York, Aug. 1993, pp. 373–382.
MSTR145—Roy, Deb. K., et al., "NewsComm: A Hand–Held Interface for Interactive Access to Structured Audio", *CHI '96 Conference Proceedings*, Vancouver, Canada, Apr. 1996, pp. 173–180.
MSTR146—Roy, Deb Kumar, "NewsComm: A Hand–Held Device for Interactive Access to Structured Audio", Masters Thesis, *MIT Media Laboratory*, 1995.*
MSTR147—Emmett, Keith, et al., "Synthetic News Radio", *IBM Systems Journal*, vol. 39, Nos. 3 & 4, 2000, pp. 646–659.*
MSTR148—MicroStrategy: "MicroStrategy Announces the General Availability of DSS Broadcaster", *Business Wire*, Aug. 11, 1998, Proquest #32759243.*
MSTR149—Intrepid Systems: "Intrepid Systems to Integrate DSS Broadcaster with Its "DecisionMaster" Decision Support Solution; Non–PC Users Benefit from Receiving High–Impact, Mission Critical Information", *Business Wire*, Aug. 11, 1998, Proquest #32760823.*
MSTR150—MicroStrategy: "MicroStrategy's DSS Broadcaster Supports Personal Digital Assistants and Advanced Wireless Data Devices", *Business Wire*, Sep. 8, 1998, Proquest #33719588.
MSTR151—Mills, Mike, "Putting the Internet in Your Hand; Nokia's Phone/Palmtop Computer Offers a Glimpse of the Furture", *The Washington Post*, Jun. 29, 1998, Proquest #30839088.
MSTR152—Spyglass Prism Concepts and Applications, 1997, Spyglass, Inc., pp. 1–8.
MSTR153—Spyglass White Paper; Spyglass Product Strategy: Making Devices work with the Web, 1997, Spyglass, Inc., pp. 1–9.
MSTR154—Kane, Margaret, "Microsoft Acquires Hotmail", *ZDNet News*, Dec. 30, 1997, 2, pages,
MSTR155—Emmett, Keith, et al., "Synthetic Audio Newscast", *The MIT Media Laboratory*, Dec. 1998, pp. 1–2.

* cited by examiner

SYSTEM AND METHOD FOR THE CREATION AND AUTOMATIC DEPLOYMENT OF PERSONALIZED DYNAMIC AND INTERACTIVE VOICE SERVICES

RELATED APPLICATIONS

This application claims priority from U.S. Provisional Application Ser. No. 60/153,222, filed 13 Sep. 1999, entitled "SYSTEM AND METHOD FOR THE CREATION AND AUTOMATIC DEPLOYMENT OF PERSONALIZED, DYNAMIC AND INTERACTIVE VOICE SERVICES."

This application is also related by subject matter to the following U.S. Patent Applications: U.S. application Ser. No. 10/073,331, filed 13 Feb. 2002, entitled "SYSTEM AND METHOD FOR THE CREATION AND AUTOMATIC DEPLOYMENT OF PERSONALIZED, DYNAMIC AND INTERACTIVE VOICE SERVICES, WITH CLOSED LOOP TRANSACTION PROCESSING," which is a continuation of U.S. application Ser. No. 09/455,525, filed 7 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES, WITH CLOSED LOOP TRANSACTION PROCESSING," now abandoned; U.S. application Ser. No. 09/455,533, filed 7 Dec. 1999, entitled SYSTEM AND METHOD FOR THE CREATION AND AUTOMATIC DEPLOYMENT OF PERSONALIZED, DYNAMIC AND INTERACTIVE VOICE SERVICES WITH REAL-TIME DATABASE QUERIES;" U.S. application Ser. No. 09/455,529, filed 7 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES WITH REAL-TIME DRILLING VIA TELEPHONE;" U.S. application Ser. No. 09/661,188, filed 13 Sep. 2000, entitled "SYSTEM AND METHOD FOR THE CREATION AND AUTOMATIC DEPLOYMENT OF PERSONALIZED, DYNAMIC AND INTERACTIVE VOICE SERVICES INCLUDING MODULE FOR GENERATING AND FORMATTING VOICE SERVICES;" U.S. application Ser. No. 10/072,898, filed 12 Feb. 2002, entitled "SYSTEM AND METHOD FOR THE CREATION AND AUTOMATIC DEPLOYMENT OF PERSONALIZED, DYNAMIC AND INTERACTIVE VOICE SERVICES WITH CUSTOMIZED MESSAGE DEPENDING ON RECIPIENT," which is a continuation of U.S. application Ser. No. 09/455,527, filed 7 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES WITH CUSTOMIZED MESSAGE DEPENDING ON RECIPIENT;" U.S. application Ser. No. 09/661,377, filed 13 Sep. 2000, entitled "SYSTEM AND METHOD FOR CREATING VOICE SERVICES FOR INTERACTIVE VOICE BROADCASTING;" U.S. application Ser. No. 09/661,375, filed 13 Sep. 2000, entitled "SYSTEM AND METHOD FOR THE CREATION AND AUTOMATIC DEPLOYMENT OF PERSONALIZED, DYNAMIC AND INTERACTIVE VOICE SERVICES, WITH SYSTEM AND METHOD THAT ENABLE ON-THE-FLY CONTENT AND SPEECH GENERATION;" U.S. application Ser. No. 09/496,357, filed 2 Feb. 2000, entitled "SYSTEM AND METHOD FOR PERSONALIZING INTERACTIVE VOICE BROADCASTS;" U.S. application Ser. No. 09/661,471, filed 13 Sep. 2000, entitled "SYSTEM AND METHOD FOR THE CREATION AND AUTOMATIC DEPLOYMENT OF PERSONALIZED, DYNAMIC AND INTERACTIVE VOICE SERVICES INCLUDING A MARKUP LANGUAGE FOR CREATING VOICE SERVICES;" U.S. application Ser. No. 09/454,604, filed 7 Dec. 1999, entitled "SYSTEM AND METHOD FOR VOICE SERVICE BUREAU," now U.S. Pat. No. 6,263,051, issued 17 Jul. 2001; U.S. application Ser. No. 09/496,356, filed 2 Feb. 2000, entitled "SYSTEM AND METHOD FOR THE CREATION AND AUTOMATIC DEPLOYMENT OF PERSONALIZED, DYNAMIC AND INTERACTIVE VOICE SERVICES, WITH TELEPHONE-BASED SERVICE UTILIZATION AND CONTROL;" U.S. application Ser. No. 09/455,523, filed 7 Dec. 1999, entitled "SYSTEM AND METHOD FOR REAL-TIME, PERSONALIZED, DYNAMIC, INTERACTIVE VOICE SERVICES FOR INFORMATION RELATED TO EXISTING TRAVEL SCHEDULE;" U.S. application Ser. No. 09/454,601, filed 7 Dec. 1999, entitled "SYSTEM AND METHOD FOR REAL-TIME, PERSONALIZED, DYNAMIC, INTERACTIVE VOICE SERVICES FOR INVENTORY-RELATED INFORMATION;" U.S. application Ser. No. 09/454,597, filed 7 Dec. 1999, entitled "SYSTEM AND METHOD FOR REAL-TIME, PERSONALIZED, DYNAMIC, INTERACTIVE VOICE SERVICES FOR CORPORATE-ANALYSIS RELATED INFORMATION;" U.S. application Ser. No. 09/455,524, filed 7 Dec. 1999, entitled "SYSTEM AND METHOD FOR REAL-TIME, PERSONALIZED, DYNAMIC, INTERACTIVE VOICE SERVICES FOR INVESTMENT-RELATED INFORMATION;" U.S. application Ser. No. 09/454,603, filed 7 Dec. 1999, entitled "SYSTEM AND METHOD FOR REAL-TIME, PERSONALIZED, DYNAMIC, INTERACTIVE VOICE SERVICES FOR ENTERTAINMENT-RELATED INFORMATION;" U.S. application Ser. No. 09/455,532, filed 7 Dec. 1999, entitled "SYSTEM AND METHOD FOR REAL-TIME, PERSONALIZED, DYNAMIC, INTERACTIVE VOICE SERVICES FOR PROPERTY-RELATED INFORMATION;" U.S. application Ser. No. 09/454,599, filed 7 Dec. 1999, entitled "SYSTEM AND METHOD FOR REAL-TIME, PERSONALIZED, DYNAMIC, INTERACTIVE VOICE SERVICES FOR RETAIL-RELATED INFORMATION;" U.S. application Ser. No. 09/455,530, filed 7 Dec. 1999, entitled "SYSTEM AND METHOD FOR REAL-TIME, PERSONALIZED, DYNAMIC, INTERACTIVE VOICE SERVICES FOR BOOK-RELATED INFORMATION;" U.S. application Ser. No. 09/455,526, filed 7 Dec. 1999, entitled "SYSTEM AND METHOD FOR REAL-TIME, PERSONALIZED DYNAMIC, INTERACTIVE VOICE SERVICES FOR TRAVEL AVAILABILITY INFORMATION;" U.S. application Ser. No. 09/661,189, filed 13 Sep. 2000, entitled "SYSTEM AND METHOD FOR VOICE-ENABLED INPUT FOR USE IN THE CREATION AND AUTOMATIC DEPLOYMENT OF PERSONALIZED, DYNAMIC, AND INTERACTIVE VOICE SERVICES;" U.S. application Ser. No. 09/455,534, filed 7 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES, WITH INTEGRATED IN BOUND AND OUTBOUND VOICE SERVICES;" U.S. application Ser. No. 09/496,425, filed 2 Feb. 2000, entitled "SYSTEM AND METHOD FOR THE CREATION AND AUTOMATIC DEPLOYMENT OF PERSONALIZED, DYNAMIC AND INTERACTIVE VOICE SERVICES, WITH THE DIRECT DELIVERY OF VOICE SERVICES TO NETWORKED VOICE MESSAGING SYSTEMS;" U.S. application Ser. No. 09/454,598, filed 7 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES, INCLUDING DEPLOYMENT THROUGH DIGITAL SOUND FILES;" U.S. application Ser. No. 09/454,600, filed 7 Dec. 1999, entitled "SYSTEM AND METHOD FOR THE CREATION AND AUTOMATIC DEPLOYMENT OF PERSONALIZED, DYNAMIC AND INTERACTIVE VOICE SERVICES, INCLUDING DEPLOYMENT THROUGH PERSONALIZED BROADCASTS;" and U.S. Application Ser. No. 09/661,191, filed 13 Sep. 2000, entitled "SYSTEM AND METHOD FOR THE CREATION AND AUTOMATIC DEPLOYMENT OF PERSONALIZED, DYNAMIC AND INTERACTIVE VOICE SERVICES, WITH REAL-TIME INTERACTIVE VOICE DATABASE QUERIES."

FIELD OF THE INVENTION

This invention relates to a system and method for creation and automatic deployment of personalized, dynamic and interactive voice services, including information derived from on-line analytical processing (OLAP) systems and other data repositories. More specifically, the invention relates to a system and method that enable personalized delivery of information in real-time, via natural language voice communication with a voice-enabled terminal device. The system and method combines personalized information broadcast technology with an active voice page. An active voice page is a mark-up language document that is used to dynamically generate interactive voice menus to deliver content and request and handle user input. The active voice page (AVP) is created by the system, stored in a call database, and used to generate and control an interactive voice broadcast (IVB). A call server retrieves the AVP from the call database and delivers the content of the voice service by dialing a subscriber's telephone number, speaking message text to the subscriber and recording the subscriber's inputs in response to the voice menus. When a voice service is executed, the system submits a call request to the call server via a MicroStrategy Broadcast Server or MicroStrategy Voice Bureau Web Server or inserts the necessary information directly into a call table.

A unique AVP is generated for each subscriber scheduled to receive voice service content. An AVP service contains the call structure and data and is used in conjunction with voice style parameters and personal identification information designated for the subscriber to deliver a voice service.

BACKGROUND OF THE INVENTION

The ability to act quickly and decisively in today's increasingly competitive marketplace is critical to the success of any organization. The volume of data that is available to organizations is rapidly increasing and frequently overwhelming. The availability of large volumes of data presents various challenges. One challenge is to avoid inundating an individual with unnecessary information. Another challenge is to ensure all relevant information is available in a timely manner.

One known approach to addressing these and other challenges is known as data warehousing. Data warehouses, relational databases, and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of record, such as one or more transaction-based database systems. A data warehouse typically allows users to tap into a business's vast store of operational data to track and respond to business trends that facilitate forecasting and planning efforts. A data mart may be considered to be a type of data warehouse that focuses on a particular business segment.

Decision support systems have been developed to efficiently retrieve selected information from data warehouses. One type of decision support system is known as an on-line analytical processing system. In general, OLAP systems analyze the data from a number of different perspectives and support complex analyses against large input data sets.

There are at least three different types of OLAP architectures—ROLAP, MOLAP, and HOLAP. ROLAP ("Relational On-Line Analytical Processing") systems are systems that use a dynamic server connected to a relational database system. Multidimensional OLAP ("MOLAP") utilizes a proprietary multidimensional database ("MDDB") to provide OLAP analyses. The main premise of this architecture is that data must be stored multi-dimensionally to be viewed multi-dimensionally. A HOLAP ("Hybrid On-Line Analytical Processing") system is a hybrid of these two.

ROLAP is a three-tier, client/server architecture comprising a presentation tier, an application logic tier and a relational database tier. The relational database tier stores data and connects to the application logic tier. The application logic tier comprises a ROLAP engine that executes multidimensional reports from multiple end users. The ROLAP engine integrates with a variety of presentation layers, through which users perform OLAP analyses. The presentation layers enable users to provide requests to the ROLAP engine. The premise of ROLAP is that OLAP capabilities are best provided directly against a relational database, e.g., the data warehouse.

In a ROLAP system, data from transaction-processing systems is loaded into a defined data model in the data warehouse. Database routines are run to aggregate the data, if required by the data model. Indices are then created to optimize query access times. End users submit multidimensional analyses to the ROLAP engine, which then dynamically transforms the requests into SQL execution plans. The SQL is submitted to the relational database for processing, the relational query results are cross-tabulated, and a multidimensional result set is returned to the end user. ROLAP is a fully dynamic architecture capable of utilizing precalculated results when they are available, or dynamically generating results from atomic information when necessary.

The ROLAP architecture directly accesses data from data warehouses, and therefore supports optimization techniques to meet batch window requirements and to provide fast response times. These optimization techniques typically include application-level table partitioning, aggregate inferencing, denormalization support, and multiple fact table joins.

MOLAP is a two-tier, client/server architecture. In this architecture, the MDDB serves as both the database layer and the application logic layer. In the database layer, the MDDB system is responsible for all data storage, access, and retrieval processes. In the application logic layer, the MDDB is responsible for the execution of all OLAP requests. The presentation layer integrates with the application logic layer and provides an interface through which the end users view and request OLAP analyses. The client/server architecture allows multiple users to access the multidimensional database.

Information from a variety of transaction-processing systems is loaded into the MDDB System through a series of batch routines. Once this atomic data has been loaded into the MDDB, the general approach is to perform a series of batch calculations to aggregate along the orthogonal dimensions and fill the MDDB array structures. For example, revenue figures for all of the stores in a state would be added together to fill the state level cells in the database. After the array structure in the database has been filled, indices are created and hashing algorithms are used to improve query access times.

Once this compilation process has been completed, the MDDB is ready for use. Users request OLAP reports through the presentation layer, and the application logic layer of the MDDB retrieves the stored data.

The MOLAP architecture is a compilation-intensive architecture. It principally reads the pre-compiled data, and has limited capabilities to dynamically create aggregations or to calculate business metrics that have not been pre-calculated and stored.

The hybrid OLAP ("HOLAP") solution is a mix of MOLAP and relational architectures that support inquiries against summary and transaction data in an integrated fashion. The HOLAP approach enables a user to perform multidimensional analysis on data in the MDDB. However, if the user reaches the bottom of the multidimensional hierarchy and requires more detailed data, the HOLAP engine generates an SQL to retrieve the detailed data from the source relational database management system ("RDBMS") and returns it to the end user. HOLAP implementations rely on simple SQL statements to pull large quantities of data into the mid-tier, multidimensional engine for processing. This constrains the range of inquiry and returns large, unrefined result sets that can overwhelm networks with limited bandwidth.

As described above, each of these types of OLAP systems are typically client-server systems. The OLAP engine resides on the server side and a module is typically provided at a client-side to enable users to input queries and report requests to the OLAP engine. Many current client-side modules are typically stand alone software modules that are loaded on client-side computer systems. These systems require that a user must learn how to operate the client-side software module in order to initiate queries and generate reports.

Additionally, the product DSS Broadcaster was introduced by MicroStrategy to output OLAP reports to users via various output delivery devices. The current version of DSS Broadcaster is a one-way delivery of information from the DSS Broadcaster system to the user.

Another system in use today is a interactive telephone system that enables user to interactively request information through a computerized interface. These systems require that the user call in to a central number to access the system and request information by stepping through various options in predefined menu choices. Such information may include accessing account information, movie times, service requests, etc.

A problem with these systems is that the menu structure is typically set and not customized to a particular's users preferences or customized to the information available to that user. Therefore, a user may have to wade through a host of inapplicable options to get to the one or two options applicable to that user. Further, a user may be interested in s particular information. With existing telephone call-in systems, that user has to input the same series of options each time they want to hear the results of that report. If the user desires to run that report frequently, the telephone input system described is a very time consuming and wasteful method of accessing that information. Also, if a particular user may only be interested in knowing if a particular value or set of values in the report has changed over a predetermined period of time, in such a system, the user would be required to initiate the report frequently and then scan through the new report to determine if the information has changed over the time period specified.

Further, reports may be extensive and may contain a large amount of information for a user to sort through each time a report is run. Therefore, the user may have to wait a long time for the report to be generated once they input the appropriate parameters for the report.

These and other drawbacks exist with current systems.

SUMMARY OF THE INVENTION

An object of the invention is to overcome these and other drawbacks in existing systems.

One aspect of the invention relates to the creation and deployment of personalized, dynamic and interactive voice services including delivery of information from OLAP systems or other data repositories. A voice service comprises at least six characteristics: service type, content type, schedule, content definition, personalization settings and error handling settings. Once a voice service is set-up, a user can subscribe to the voice service. Based upon the occurrence of a predetermined event (for example, a schedule and/or a trigger event) a voice service may be executed. Execution of a voice service preferably comprises the steps of generating voice service content, creating an active voice page (AVP) (call structure), sending the AVP to a service queue, conducting an interactive voice broadcast (IVB) and writing user responses. Preferably during each IVB, a synthesized, natural-sounding voice greets the recipient by name, identifies itself and provides information relevant to the subscriber. The system then either prompts the person for a response or presents a choice of menu options that lead to more dialog.

One aspect of the invention combines elements of data analysis, web and telephony technologies into one solution. The result is a truly personalized voice broadcasting server. Unlike other telephony applications, the system of the present invention is pro-active, dynamic, personalized and interactive.

Unlike traditional call centers and Interactive Voice Response (IVR) systems which require a user to call a specific number and then spend a significant amount of time searching through the information presented, the present invention can automatically generate a fully personalized message and automatically make an outbound call. Calls maybe based on individually defined schedules or exception criteria, which are usually submitted by the user during a subscription process (e.g., web- or phone-based).

The system creates fully personalized calls by generating an XML-based document (the AVP) for every message that goes out. This document then determines in real-time the individual call flow. Call content varies depending on the user and the responses that are entered. By simply using the telephone keypad (or other input mechanism) users can control the entire call flow, select given options, enter information at user prompts and conduct transactions. Additionally, the system can collect user inputs and provide them to external applications, databases and transaction systems.

For increased flexibility in application development and for easy integration with external applications, one embodiment of the invention uses an XML/XSL based approach for its execution of an IVB. Extensible Markup Language (XML) is a data tagging language that allows the system to turn data from multiple sources into a system independent format that can easily be processed and formatted. By applying Extensible Stylesheet Language (XSL) documents to this XML-based information, the system defines in real-time how information will be transformed to generate personal reports in natural language format, as well as to determine data driven call-flows. Telecaster Markup Language (TML) is a derivative of XML. TML is designed specifically for text-to-speech conversion and interactive voice broadcasting.

Active Voice Pages represent a novel concept for personalizing phone-based user dialogs. Active Voice Pages are XML/TML based documents that are dynamically generated by the system and determine every aspect of the individual user interaction.

Active Voice Pages may include one or more of the following features: personalized reports including personal greetings with the recipient's name; personalized and fully data-driven menu options; fully encrypted transmission of personal PIN code information; extensive error handling capabilities such as user time-out; comprehensive interaction-driven call logic, e.g., number of retries for entering PIN code information; XML-based scripting language for storing user inputs in pre-defined variables, conducting real-time calculations, etc.; and flags to initiate communication and data transfer to external applications The invention further enables and takes advantage of the closed-loop capability of standard telephones (and other voice enabled terminal devices). By simply pressing the keys of their phone users can instantly initiate feedback and conduct transactions. As soon as a call is initiated, the system's embedded telephony modules monitor the call line and transform user inputs (coming in as touchtone signals) into textual and numerical information that can be processed by the current Active Voice Page. When a user is prompted to enter information, the response updates a pre-defined variable stored in the Active Voice Page. By combining this information with data about the user and the current call session, a transaction can be uniquely identified and securely transmitted to external applications, databases or transaction servers.

As described above, the system stores user inputs into the current Active Voice Page. In addition to commands used to determine call content, structure and user prompts, active voice pages can also contain flags to initiate external programs. As soon as the active voice page reaches this flag during the call flow, the program is initiated and pre-determined variables are transferred to external applications. Advantageously, the information already exists in a standardized format (XML) to facilitate integration. For example, the system can execute SQL statements, make direct API calls or transfer information via XML-based data and application gateways.

The voice services are based on real-time, text-to-speech conversion, to allow for truly personalized messaging. Unlike other telephony applications such as phone-banking or phone-based trading services that traditionally use static pre-recorded files, text-to-speech conversion does not impose any limitations on the content of the call. The system can speak customer names, product brands and other terms. Further, it leverages specific algorithms to resolve special content such as numbers, phone numbers or dates etc. In certain cases, it may be beneficial to include pre-recorded dialog components and other audio files (sound effects, music, testimonials, etc.). Thus, the system enables blending of static and dynamic content in various parts of the message.

According to one embodiment, the call server of the present invention comprises computer telephony software that processes each call, TML/XML parser for resolving the Active Voice Pages, a text-to-speech engine, and a call table where statistics and responses are stored.

An enterprise may deploy thousands of data-driven telephone calls designed to enhance business processes, sell information, or market products and services. Each telephone call can be customized to target the specific needs and interests of the user (subscriber). The structure of each call is entirely dynamic, driven by current data values and presenting a different experience to each user.

Voice service content is comprised of messages to be played to the recipient and prompts designed to retrieve information from the recipient. The voice service interfaces allow the administrator to define a series of dialogs that contain messages and requests for user inputs and determine the call flow between these dialogs based on selections made by the user.

A Voice Service can be defined using a Voice Service wizard. There are at least two ways to create voice service content within the Voice Service Wizard using the Dialog Wizard, which steps the administrator through the various components of a dialog; and by using the Voice Content Editor, which allows the administrator to simulate the execution of a call and to view all dialogs while inserting content directly into the dialog tree structure.

The administrator builds a voice service by defining the structure of an IVB and adding content. The IVB structure (or call structure) determines how the Call System and the user will interact during a call. During a typical call, information is exchanged between the Call System and the user. The Call System reads a message to the user and, in response, the user may press buttons on a telephone touch pad dial to hear more information. This shapes the structure of a basic exchange between the call system and the user. The user's responses may be stored during the call and processed during the call or after by the system or other applications.

The Voice Service Wizard provides an easy-to-use interface for the creation of a voice service. It can also be used to update and edit existing voice services. The wizard starts with an introduction screen that describes the steps to be followed.

The Voice Service Wizard allows the administrator to give the service a name and description; set the service's schedule or trigger event(s); define the service's content; select personalization modes for each project; and specify how to handle error cases. The structure of a service as defined in the Voice Service Wizard is translated into TML before being sent to a call server. The Voice Service Wizard uses TML tags that define the elements of an IVB.

The DIALOG element defines a unit of interaction between the user and the system. It can contain all of the other elements. A Dialog element preferably cannot be contained in another element, including another Dialog. The SPEECH element defines the text to be read to the user. The PROMPT element is used to define that a sequence of keypresses is expected as response. The INPUT element defines a section of a Dialog that contains interactive elements i.e., those elements that pertain to response expected from a user and its validation. The OPTION element defines a menu choice that is associated with a particular phone key. The FOR-EACH element loops through a list of variables, e.g., contained in a database report, or from user input to dynamically generate speech from data. The ERROR element is a child of an INPUT element. It defines the behavior of the Call System, if a subscriber makes an invalid response, such as pressing a key that has not been associated with any choice by an option, or entering input that does not meet the filter criteria of a PROMPT statement. SYS-ERROR system defines a handler for certain call system events such as expiration of the waiting time for user input.

In addition to the elements described above, voice services may also use at least two other features to enhance the administrator's ability to design powerful voice services.

Call Flow Reports allow the administrator to generate the structure of a call based on data returned by a report or query. For instance, the options of a dialog may correspond to the rows returned by a personalized report. The report data is converted to options by application of an XSL, and inserted into the static structure of the call when the service is executed. XSL Style sheets can be associated with Call Flow Reports or with Content reports. With Call Flow reports, they are used to generate the call structure by creating dialogs, options and prompts based on report data. With content reports, they are used to generate a plain text string that may comprise the message at any node in the call structure.

In creating a voice service the administrator structures the flow of an IVB by defining a number of dialogs and the conditions that will lead the recipient from one dialog to another. A dialog is created by adding elements to a telecast tree, with the highest level element being the dialog element. The dialog can consist of multiple speech sections and an input section that contains option or prompt or error elements. A dialog also contains an error node that defines how errors made by recipients should be handled.

According to another embodiment, the system and method of the present invention may comprise a voice service bureau. According to one embodiment, the voice service bureau (VSB) accepts call requests from remotely located client servers via secured HTTPS protocol, authenticates the requests and then makes the calls to the subscribers. If the invention is deployed in a VSB mode, the call server may reside at a VSB location (e.g., remote from the client server). The VSB is a network operations center constructed and maintained for the purpose of processing telephone calls requested by a remote broadcast server, e.g., a MicroStrategy Broadcast Server. The VSB may receive call requests via the Internet.

The VSB enables a customer to access complete voice and audio broadcasting functionality without being required to purchase or maintain any additional telephone lines, telephony hardware or calling software. To use the VSB, a customer may be required to establish a VSB account and create voice services. No further administrative duties are required by the customer to use the VSB. The VSB provides complete system and network administration services for its proper operation and maintenance.

According to another embodiment, a VSB may include the functionality necessary to create voice services as well. In this embodiment, a user could subscribe to voice services e.g., via phone or web, and receive IVBs without maintaining any infrastructure.

According to another aspect of the invention, the content and structure of a voice service is defined in TML format and sent to the call server. TML follows the Extended Markup Language (XML) syntax and is used to tag distinct parts of a telephone interaction that are required in order to deliver and/or prompt users with information.

Inbound calling can be handled in a variety of ways. According to one embodiment the system could create personalized Active Voice Pages in batch load, create a mechanism that identifies an inbound caller and redirects him to his personal AVP. AVPs could be stored and managed using a RDBMS system using text fields or a "BLOB" approach. Even without personalization, TML is flexible enough to support inbound calling and IVR systems. According to another embodiment, the system enables an inbound caller to search for a particular AVP, e.g., be entering alpha-numeric characters using the telephone keypad.

Other features and advantages of the present invention will be apparent to one of ordinary skill in the art upon reviewing the detailed description of the present invention.

DETAILED DESCRIPTION OF THE PREFERRED EMBODIMENTS

According to one embodiment of the present invention, a system is provided for automatic, interactive, real-time, voice transmission of OLAP output to one or more subscribers. For example, subscribers may be called by the system, and have content delivered audibly over the telephone or other voice-enabled terminal device. During the IVB, information may be exchanged between the system and a subscriber. The system conveys content to the subscriber and, the subscriber may respond by pressing one or more buttons on a telephone touch pad dial (or other input mechanism) to hear more information, to exercise options, or to provide other responses. This interaction shapes the structure of a basic exchange between the system and the subscriber. During or after the call is terminated, the subscriber's responses may be stored and processed (e.g., by other applications).

Figure 1A:
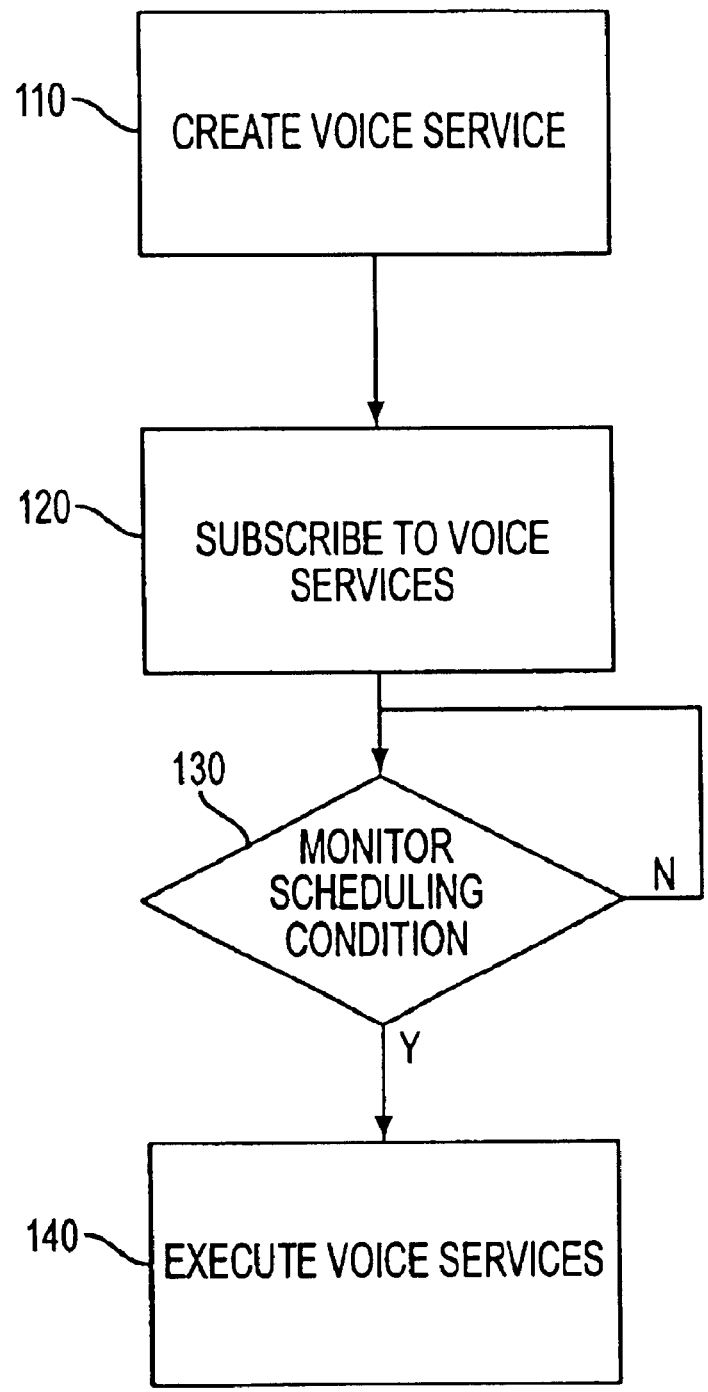
FIG. 1a is a flow chart of a method in accordance with an embodiment of the present invention.

According to one embodiment of the present invention, a method for automatic, interactive, real-time, voice transmission of OLAP output to one or more subscribers is provided. FIG. 1a depicts a flow chart of a method for automatic, interactive, real-time, voice transmission of OLAP output according to one embodiment. The method begins in step 110 with the creation of a voice service (e.g., by a system administrator or user). A voice service is created using, for example, a voice service wizard which may comprise a series of interfaces. One embodiment of a method for creating a voice service is explained in more detail below in conjunction with FIG. 1b. One embodiment of a voice service wizard is explained below in conjunction with FIG. 3b.

After a voice service is created, users may subscribe or be subscribed to the voice service (step 120), for example, by using a subscription interface. According to one embodiment, users may subscribe to an existing voice service over the telephone or by web-based subscription. A user may also be subscribed programmatically. In other embodiments, a user may subscribe to a voice service via electronic mail. Not every voice service created in step 110 is available for subscription. More specifically, according to another embodiment, only a user with appropriate access, such as the creator of the service, is allowed to subscribe himself or others to a service. Such a security feature may be set when the voice service is created.

In step 130, a scheduling condition or other predetermined condition for the voice services is monitored to determine when they are to be executed. That is, when a voice service is created or subscribed to, the creator or user specifies when the voice service is to be executed. A user may schedule a voice service to execute according to the date, the time of day, the day of the week, etc. and thus, the scheduling condition will be a date, a time, or a day of the week, either one time or on a recurring basis. In the case of an alert service, discussed in more detail below, the scheduling condition will depend on satisfaction of one or more conditions. According to one embodiment, the condition(s) to be satisfied is an additional scheduling condition. According to another embodiment, to another embodiment, a service may be executed "on command" either through an administrator or programmatically through an API. Scheduling of voice services is discussed in more detail below.

The method continues monitoring the scheduling condition for voice services until a scheduling condition is met. When a scheduling condition is met, that voice service is executed. The execution of a voice service involves, inter alia, generating the content for the voice service, and structuring the voice service to be telecast through a call server. The execution of a voice service is explained in detail in conjunction with FIG. 1c.

An example of a telecast is as follows.
PERSONALIZED GREETING
Hello Joe, this is your stock update.
PIN VERIFICATION
Please enter your six digit PIN number
(Joe enters his PIN, using the keypad dial on his telephone.)
MENU OPTIONS
Your portfolio was up by $1000 today.
Please select:
1. To get a portfolio stock update
2. To conduct a transaction
(Joe presses 2)
SUB MENU
Thank you, Joe! Please select a ticker.
1. PQT
2. TQP
3. Listen to options again
4. Return to main menu
(Joe presses 1.)
SUB MENU
Would you like to buy or sell stock? Please press:
1. To sell stock
2. To buy stock
(Joe presses 1.)
SUB MENU
How many shares of PQT would you like to sell today? Please press:
1. To sell 50 shares
2. To sell 100 shares
3. To sell 200 shares
4. To sell another quantity
(Joe presses 2.)
SUB MENU
You selected 2. You want to sell 100 shares of PQT. Please press:
1. If this is correct
2. If this is incorrect
3. If you want to change the number of shares you want to buy.
(Joe presses 1.)
END VOICE SERVICE/TERMINATE TELECAST
Thank you for using our voice interactive broadcasting service, Joe. We will call you
back when your transaction is completed. Good-bye.
As can be seen from the above sample during an IVB, the user is presented with information, e.g., the status of his portfolio, and is presented options related to that report, e.g., the option to buy or sell stock.

According to one embodiment, a voice service is constructed using service wizard. A voice service is constructed using several basic building blocks, or elements, to organize the content and structure of a call. According to one embodiment, the building blocks of a voice service comprise elements of a markup language. According to one particular embodiment, elements of a novel markup language based on XML (TML) are used to construct voice services. Before explaining how a telecast is constructed, it will be helpful to define these elements.

The DIALOG element is used to define a unit of interaction between the user and the system and it typically contains one or more of the other elements. A DIALOG can not be contained in another element.

The SPEECH element is used to define text to be read to a user.

The INPUT element is used to define a section of a DIALOG that contains interactive elements, i.e., those elements that relate to a response expected from a user and its validation. An INPUT element may contain OPTION, PROMPT and ERROR elements.

An OPTION element identifies a predefined user selection that is associated with a particular input. According to one embodiment, OPTION elements are used to associate one or more choices available to a user with telephone keys.

A PROMPT element defines a particular input that is expected. According to one embodiment, a PROMPT element defines that a sequence or number of key presses from a telephone keypad is expected as input. Unlike an OPTION Element, a PROMPT Element is not associated with predefined user selections.

The PROMPT and OPTION elements may also be used to request user input using natural language. According to one embodiment, speech recognition technology is used to enable a user to respond to a PROMPT element or to select an OPTION element verbally by saying a number, e.g., "one.". The verbal response is recognized and used just as a keypress would be used. According to another embodiment, the user may provide a free form verbal input. For example, a PROMPT element may request that a user enter, e.g., the name of a business. In response the user speaks the name of a business. That spoken name is then resolved against predetermined standards to arrive at the input. Word spotting and slot filling may also be used in conjunction with such a PROMPT to determine the user input. For example, a PROMPT may request that the user speak a date and time, e.g., to choose an airline flight or to make a restaurant reservation. The user's spoken response may be resolved against known date and time formats to determine the input. According to another embodiment, a PROMPT is used to request input using natural language. For instance, in conjunction with a voice service to be used to make travel plans, instead of having separate PROMPT elements request input for flight arrival, departure dates and locations, a single natural language PROMPT may ask, "Please state your travel plan." In response, the user states 'I'd like to go from Washington DC to New York city on the $3^{rd}$ of January and return on the $3^{rd}$ of February. This request would be processed using speech recognition and pattern matching technology to derive the user's input.

The ERROR element is used to define the behavior of the system if a user makes an invalid response such as touching a number that has not been associated with an OPTION element, or entering input that does not meet the criteria of a PROMPT element. A SYS-ERROR element defines a handler for certain events, such as expiration of the waiting time for a user response.

The FOR-EACH element is used to direct the system to loop through a list of variables e.g., variables contained in a database report, or variables from a user input, to dynamically generate speech from data.

In addition to the elements described above, there are two features that maximize an administrator's ability to design voice services. Call Flow Reports enable an administrator to generate the structure of a call based on the content of an report e.g., from an OLAP system or other data repository. For example, the options presented to a user in a PROMPT element may be made to correspond to the row of a data report. According to one embodiment, report data is converted into options by application of an XSL (extensible style sheet language) style sheet. The result of this application is inserted into the static call structure when the voice service is executed.

The use of an XSL style sheet is a feature that maximizes an administrator's voice service building ability. As discussed above, they are used to create dynamic call structure that depends on data report output. They may also be used to generate a text string that comprises the message to be read to a user at any point in a call.

A method for creating a voice service according to one embodiment will now be explained in conjunction with FIG. 2. The method begins in step 210 by naming the voice service. Then, in step 220 various scheduling parameters of the voice service are defined. In step 250 the service content is defined. And, in step 260, the personalization modes, or style properties are selected for the voice service.

According to one embodiment, in step 210, a voice service is named and a description of the voice service provided. By providing a name and description, a voice service may be uniquely identified. An interface is provided for prompting input of the name of the service to be created or edited. An input may also be provided for a written description. An open typing field would be one option for providing the description input. According to another embodiment, if an existing call service has been selected to edit, the service name field may not be present or may not allow modification.

In step 220, conditions for initiating the service are selected. This may include selecting and defining a service type. At least two types of services may be provided based on how the services are triggered. A first type of service is run according to a predetermined schedule and output is generated each time the service is run. A second type of service, an alert service, is one that is run periodically as well, however, output is only generated when certain criteria is satisfied. Other service types may be possible as well. In one embodiment the administrator is prompted to choose between a scheduled service or an alert service. An interface may provide an appropriate prompt and some means for selecting between a scheduled service and an alert service. One option for providing the input might be an interface with a two element toggle list.

In one embodiment, a set of alert conditions is specified to allow the system to evaluate when the service should be initiated if an alert type service has been selected. In one embodiment, a report or a template/filter combination upon which the alert is based is specified. Reports and template/filter combinations may be predefined by other objects in the system including an agent module or object creation module. According to one embodiment, an agent module, such as DSS agent™ offered by MicroStrategy, may be used to create and define reports with filters and template combinations, and to establish the alert criteria for an alert service. According to another embodiment, an interface is be provided which includes a listing of any alert conditions presently selected for the voice service. According to this embodiment, the interface may comprise a display window. A browse feature may take the user to a special browsing interface configured to select a report or filter-template combination. One embodiment of an interface for selecting reports and filter-template combinations is described below. Once a report or filter and template combination is chosen, the alerts contained in the report or filter and template combination may be listed in the display window of the interface.

In step 220, the schedule for the service is also selected. According to one embodiment, predefined schedules for voice services may be provided or a customized schedule for the voice service may be created. If a new schedule is to be created, a module may be opened to enable the schedule name and parameters to be set. Schedules may be run on a several-minute, hourly, daily, monthly, semi-annual, annual or other bases, depending upon what frequency is desired. According to one embodiment, an interface is provided that allows the administrator to browse through existing schedules and select an appropriate one. The interface may provide a browsing window for finding existing schedule files and a "new schedule" feature which initiates the schedule generating module. In one embodiment, schedules may not be set for alert type services. However, in some embodiments, a schedule for evaluating whether alert conditions have been met may be established in a similar manner.

In step 230, the duration of the service is also set. Service duration indicates the starting and stopping dates for the service. Setting a service duration may be appropriate regardless of whether a scheduled service or alert type service has been selected. The start date is the base line for the scheduled calculation, while the end date indicates when the voice service will no longer be sent. The service may start immediately or at some later time. According to one embodiment, the interface is provided to allow the administrator to input start and end dates. The interface may also allow the administrator to indicate that the service should start immediately or run indefinitely. Various calendar features may be provided to facilitate selection of start and stop dates. For example, a calendar that specifies a date with pull-down menus that allow selection of a day, month and year may be provided according to known methods of selecting dates in such programs as electronic calendar programs and scheduling programs used in other software products. One specific aid that may be provided is to provide a calendar with a red circle indicating the present date and a blue ellipse around the current numerical date in each subsequent month to more easily allow the user to identify monthly intervals. Other methods may also be used.

In step 220, a voice service may also be designated as a mid-tier slicing service. In one embodiment, mid-tier slicing services generate content and a dynamic subscriber list in a single query to an OLAP system. According to one embodiment, in a mid-tier slicing service a single database query is performed for all subscribers to the service. The result set developed by that query is organized in a table that contains a column that indicates one or more users that each row of data is applicable to.

In step 250, the content of the voice service is defined. Defining the content of the voice service may include selecting the speech to be delivered during the voice service broadcast (content), the structure of dialogs, menus, inputs, and the background procedures which generate both content and structure. In one embodiment, defining voice service content establishes the procedures performed by the vss server to assemble one or more active voice pages in response to initiation of the voice service. According to one embodiment, defining service content involves establishing a hierarchical structure of TML elements which define the structure and content of a voice service. All of the elements in a given service may be contained within a container.

The personalization type is selected in step 260. Personalization type defines the options that the administrator will have in applying personalization filters to a voice service. According to one embodiment, a personalization filter is a set of style properties that can be used to determine what content generated by the service will be delivered to the individual user and in what format it will be delivered. In one embodiment, personalizing the delivery format may include selection of style properties that determine the sex of the voice, the speed of the voice, the number of call back attempts, etc. Personalization filters may exist for individual users, groups of users, or types of users. According to one embodiment, personalization filters may be created independent of the voice service. According to this embodiment, a voice service specifies what filters are used when generating IVBs. Some personalization type options may include: allowing no personalization filters; allowing personalization filters for some users, but not requiring them; and requiring personalization filters for all interactive voice broadcasts made using the service.

According to one embodiment, specifying personalization type is accomplished by administrator input through an interface. The interface may offer a toggle list with the three options: required personalization, optional personalization, and no personalization.

Figure 3A:
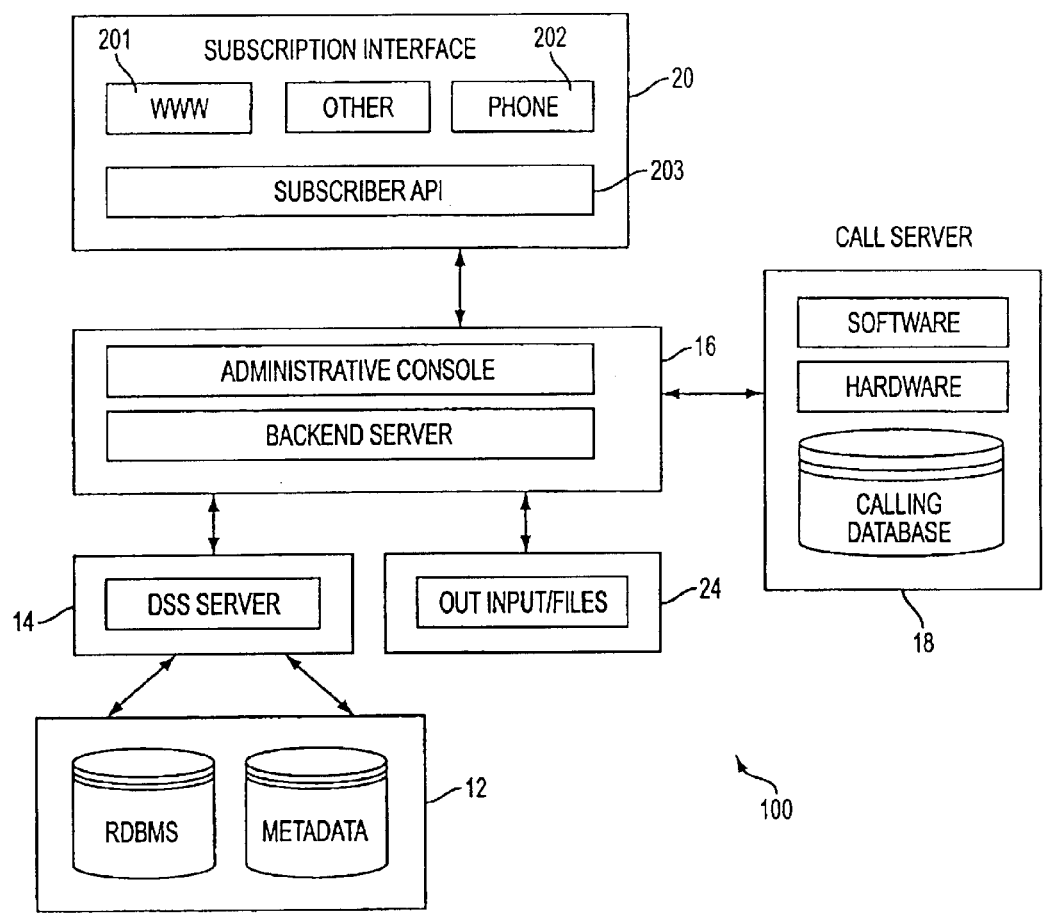
FIG. 3a is a schematic block diagram of a system in accordance with an embodiment of the present invention.
Figure 3B:
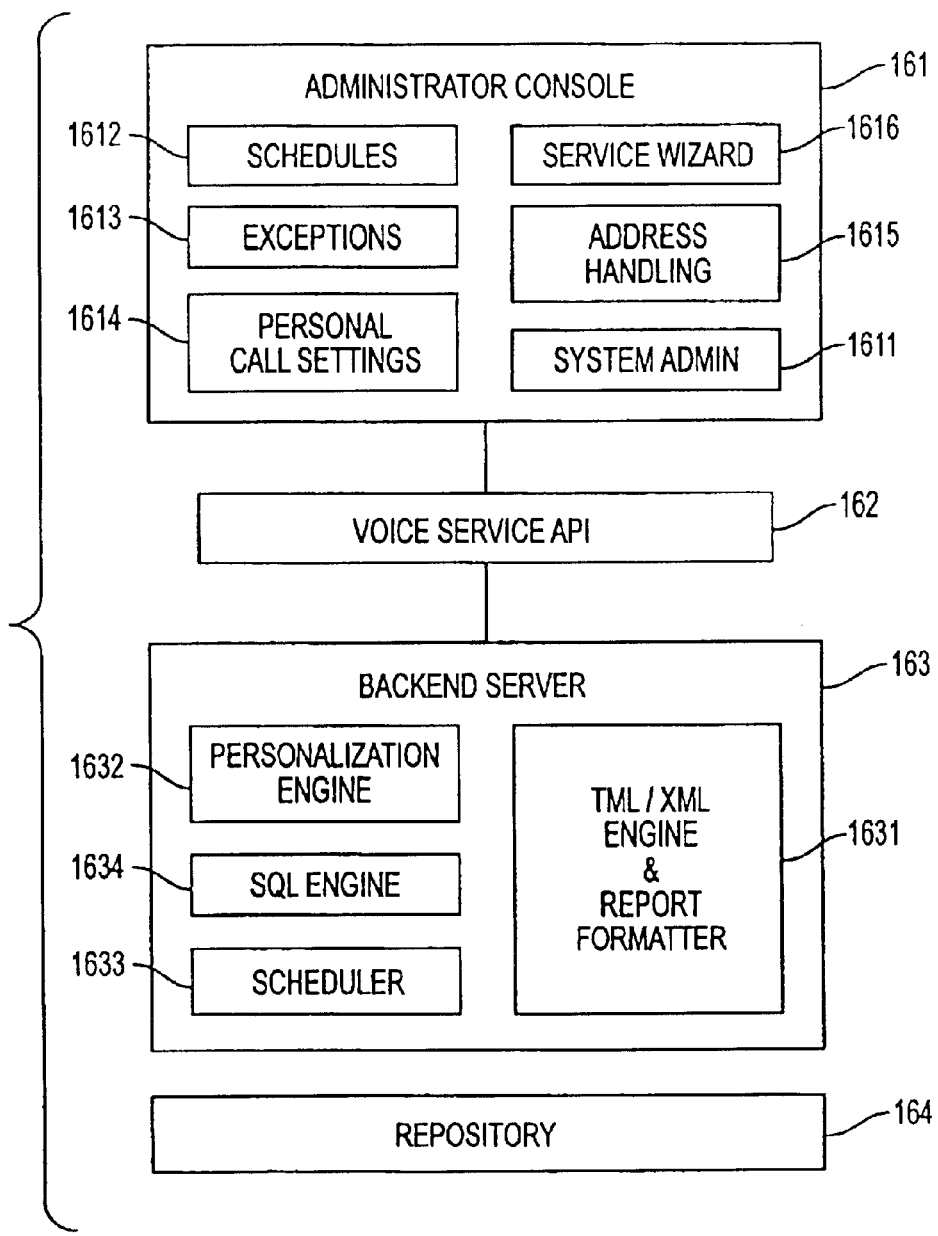
FIG. 3b is a schematic block diagram of an intelligence server according to an embodiment of the present invention.
Figure 3C:
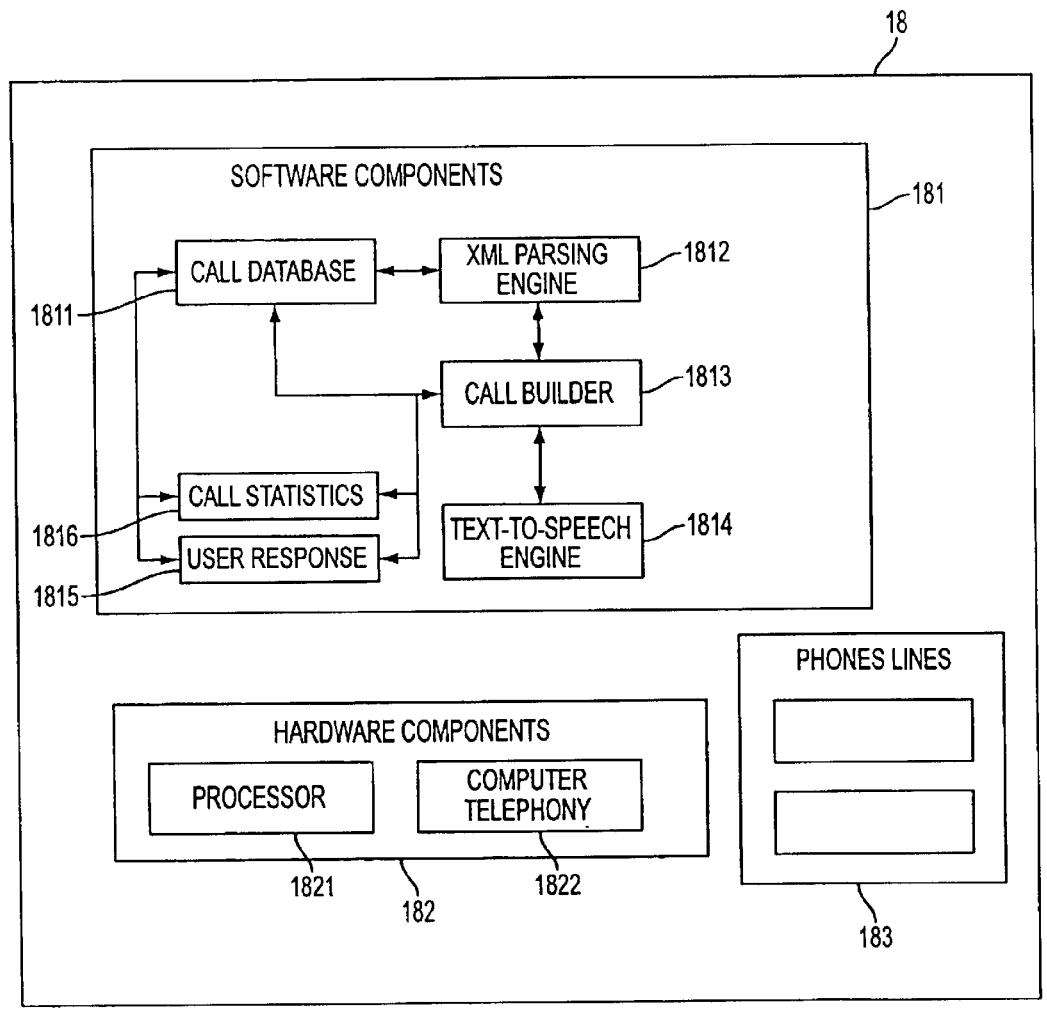
FIG. 3c is a schematic block diagram of call server according to an embodiment of the present invention.

The voice service may be stored in a database structure to enable users to retrieve predefined voice services and to subscribe to these services, for example, through subscription interfaces explained in conjunction FIGS. 3a–3c or otherwise. An interface informing the administrator that creation of the voice service is complete may also be provided.

Figure 1B:
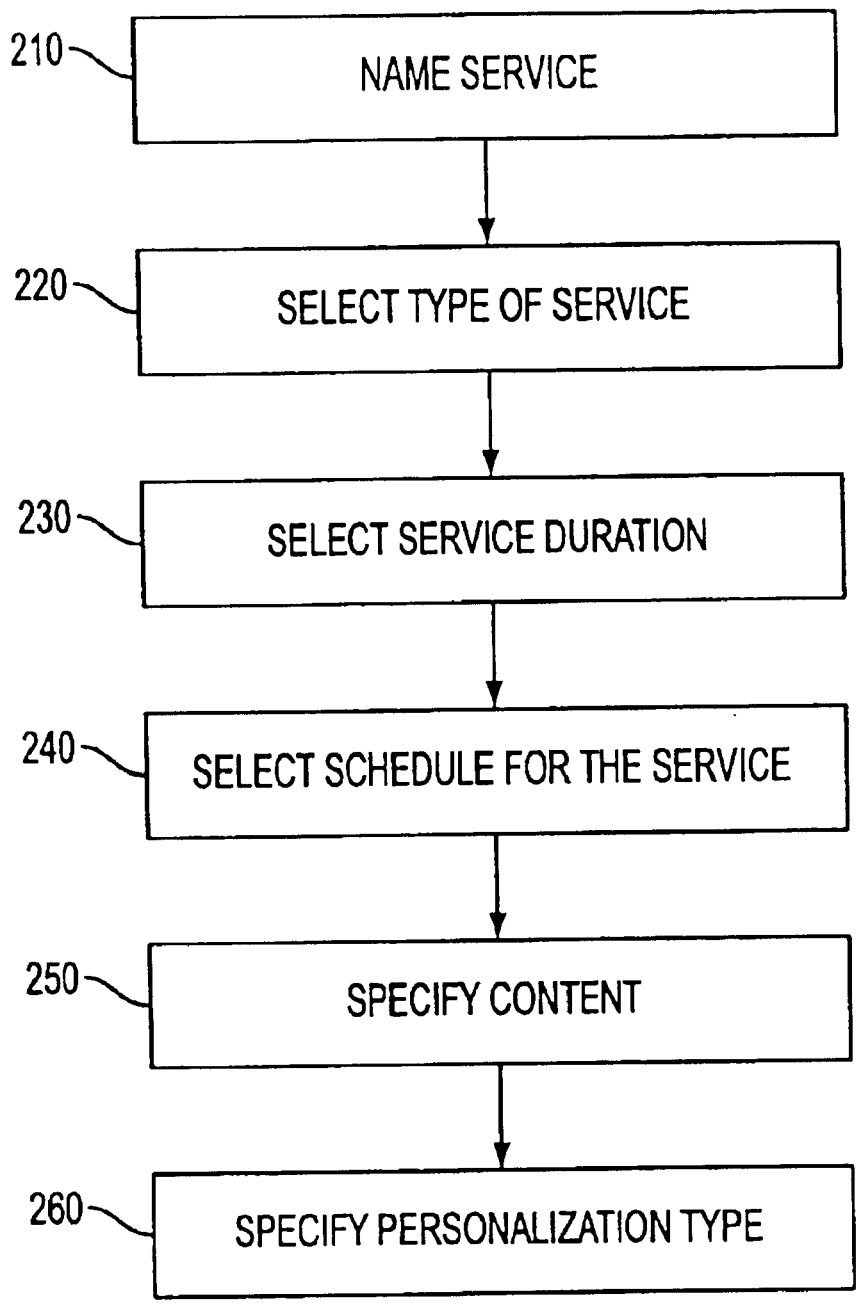
FIG. 1b is a flow chart indicating a method of generating a voice service according to one embodiment of the present invention.

According to one embodiment, the method of FIG. 1b also comprises an error condition step. An error condition step may be used to enable administrators to specify "error" conditions and the handling of those conditions. For example, an "error" condition may comprise a notification that a server is "down" or that there is no data to be returned. An administrator may specify particular actions to be performed by the system in response to one or more error conditions. For example, an administrator may specify an "addressing" error (e.g., disconnected number) and indicate a particular action to be performed in response to an "addressing" error (e.g., notify system administrator). Other error conditions might include: an alert report encountering an error and returning no data; a subscriber lacking the required personalization filter for the service; errors occurring in the generation of one or more reports; or reports returning no data Various other conditions and actions may be specified. Certain error conditions may be predetermined for the system, but an administrator may have reasons for supplementing or diverging from the predetermined error conditions. According to one particular embodiment, error conditions are specified using the ERROR and SYS-ERROR elements.

In one embodiment, setting error conditions may be accomplished using an error handling interface. The interface may allow the administrator to select either default error handling, or to customize error handling using a module for defining error handling. If default handling is selected, the system uses established settings. If customized handling is chosen, the user may use a feature to access the appropriate interface for the error handling module.

Servers may have limited capacity to perform all of the actions required of them simultaneously, the method of FIG. 1b comprises a step for prioritizing the execution and delivery of voice services. Prioritization may establish the order in which the voice service system allocates resources for processing voice service and delivering the IVB. According to one embodiment, assigning priority to a voice service establishes priority for queries to the database system, formatting the voice service, or IVBs. Any criteria may be used for establishing priority. According to one embodiment, priority is established based on service content. According to another embodiment, priority is based on service destination. According to another embodiment, priority may be established based on the type of voice service, i.e., alert v. scheduled. Any number of procedures or criteria for denoting relative importance of service delivery may be established.

In one embodiment, an interface is provided for defining the priority of the voice service being created or edited. According to one embodiment, the interface comprises a screen including option boxes with pull down menus listing the number of different prioritization options.

Figure 1C:
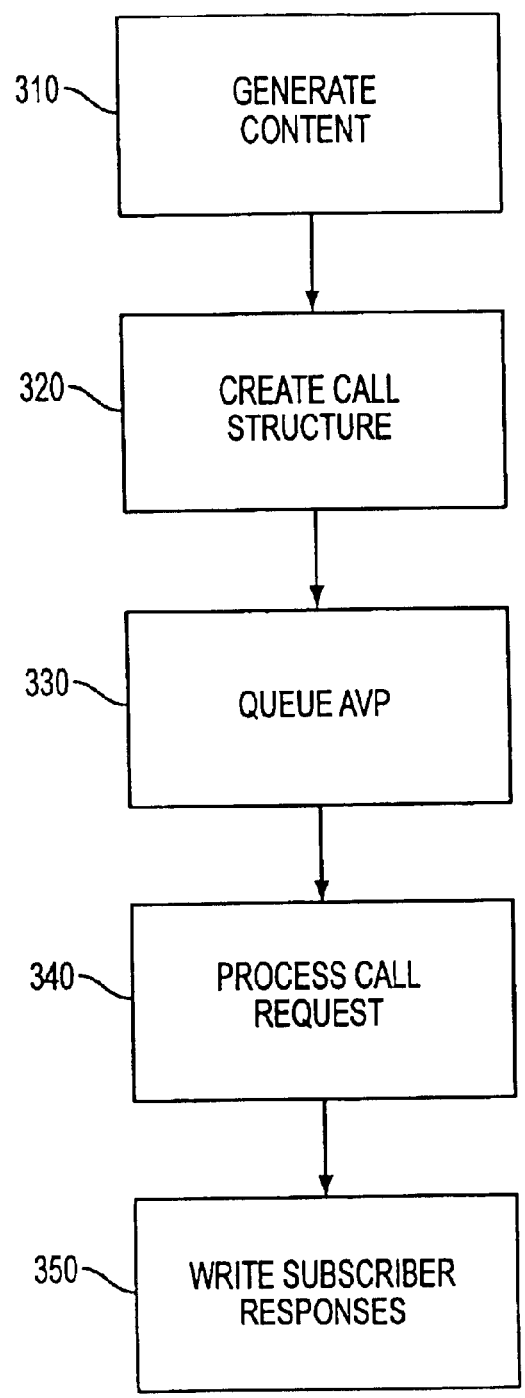
FIG. 1c is a flow chart indicating a method for interactive voice broadcasting according to an embodiment of the present invention.

Another aspect of the invention relates to a method for executing a voice service. FIG. 1c depicts one example of a flow chart for executing a voice service. In step 310, the content of a voice service is generated. In step 320, the call structure of a telecast is created via Active Voice Pages. In step 330, the AVPs are put in a call database for processing e.g., in a call queue. In step 340, the call request is processed and an interactive voice broadcast with the user is implemented. In step 350, user's responses are written back to the voice service system (e.g., the Active Voice Page). Each of these steps will be explained in more detail below.

According to one embodiment, content is created in step 310 as follows. A voice service execution begins by running scheduled reports, queries or by taking other action to determine whether the service should be sent. The subscribers for the service are then resolved. Datasets are generated for each group of subscribers that has unique personalization criteria.

Call structure may be created (step 320) as follows. An AVP contains data at various hierarchical content levels (nodes) that can be either static text or dynamic content. Static text can be generated e.g., by typing or by incorporating a text file. Dynamic content may be generated e.g., by inserting data from a data report using a grid an/or an XSL stylesheet. Moreover, content is not limited to text based information. Other media, such as, sound files, may be incorporated into the AVP. The call data (for example, at a particular level) may be the text that is converted to speech and played when the recipient encounters the node.

According to another embodiment, call content may include "standard" active voice pages that are generated and inserted into a database or Web Server where the pages are periodically refreshed. According to one particular embodiment, the active voice page that is generated for a user contains links to these standard active voice pages. The links may be followed using a process similar to web page links.

The call structure may comprise either a static structure that is defined in the voice service interfaces e.g., by typing text into a text box and/or a dynamic structure generated by grid/XSL combinations. The dynamic structure is merged with static structure during the service execution. A single call structure is created for each group of users that have identical personalization properties across all projects because such a group will receive the same content.

After a call structure is generated, in step 330, it is sent to a call database e.g., call database 1811 shown in FIG. 3c along with the addresses and style properties of the users. The style properties govern the behavior of a call server 18 in various aspects of the dialog with a user. Call server 18 queries call database 1811 for current call requests and places new call requests in its queue.

In step 340, a call request is processed. A call is implemented on call server 18 using one of several ports that are configured to handle telephone communication. When a port becomes available, the call request is removed from the queue and the call is made to the user. As the user navigates through an active voice page, e.g., by entering input using the key pad or by speaking responses, call/content is presented by converting text to speech in text-to-speech engine 1814. User input during the call may be stored for processing. According to another embodiment, user responses and other input may also be used to follow links to other active voice pages. For example, as explained above, "standard" active voice pages may be generated and inserted into a database or Web Server. Then, when a user's voice service is delivered, that voice service may contain links to information that may be accessed by a user. A user may access those standard active voice pages by entering input in response to OPTION or PROMPT elements.

In step 350, user responses are stored by the system. According to one embodiment, user responses are stored in a response collection defined by the active voice page. A voice service may specify that a subscriber return information during an IVB so that another application may process the data. For instance, a user may be prompted to purchase a commodity and be asked to enter or speak the number of units for the transaction. During or after an IVB, the subscriber's responses are written to a location from which they can be retrieved for processing (e.g., by an external application).

Figure 2:
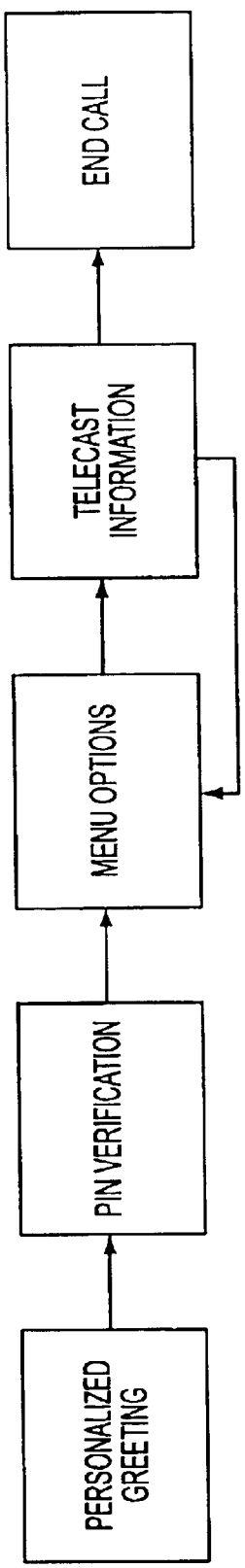
FIG. 2 is a flow chart indicating a sequence of an interactive voice broadcast according to one embodiment of the present invention.

FIG. 2 is an example of an IVB with interactive call flow. An IVB usually contains a greeting message that addresses the targeted user, identifies the name of the calling application, and states the purpose of the call and/or presents summary metrics. The voice service system can also implement a PIN verification protocol, if this layer of security is required. The main menu structure of an IVB can contain a number of options that lead to sub-menu structures. A menu can also contain prompts for the user to enter numerical information using a telephone touch pad dial. A node along the hierarchical menu structure may have options to return the user to a higher level.

FIG. 3a depicts an embodiment of a system according to one embodiment of the present invention. Preferably, the system comprises database system 12, a DSS server 14, voice server 16, a call server 18, subscription interface 20, and other out input/files 24.

Database system 12 and DSS server 14 comprise an OLAP system that generates user-specified reports from data maintained by database system 12. Database system 12 may comprise any data warehouse or data mart as is known in the art, including a relational database management system ("RDBMS"), a multidimensional database management system ("MDDBMS") or a hybrid system. DSS server 14 may comprise an OLAP server system for accessing and managing data stored in database system 12. DSS server 14 may comprise a ROLAP engine, MOLAP engine or a HOLAP engine according to different embodiments. Specifically, DSS server 14 may comprise a multithreaded server for performing analysis directly against database system 12. According to one embodiment, DSS server 14 comprises a ROLAP engine known as DSS Server™ offered by MicroStrategy.

Voice service server (VSS) 16, call server 18 and subscription interface 20 comprise a system through which subscribers request data and reports e.g., OLAP reports through a variety of ways and are verbally provided with their results through an IVB. During an IVB, subscribers receive their requested information and may make follow-up requests and receive responses in real-time as described above. Although the system is shown, and will be explained, as being comprised of separate components and modules, it should be understood that the components and modules may be combined or further separated. Various functions and features may be combined or separated Subscription interface 20 enables users or administrators of the system to monitor and update subscriptions to various services provided through VSS 16. Subscription interface 20 includes a world wide web (WWW) interface 201, a telephone interface 202, other interfaces as desired and a subscriber API 203. WWW interface 201 and telephone interface 202 enable system 100 to be accessed, for example, to subscribe to voice services or to modify existing voice services. Other interfaces may be used. Subscriber API 203 provides communication between subscription interface 20 and VSS 16 so that information entered through subscription interface 20 is passed through to VSS 16.

Subscription interface 20 is also used to create a subscriber list by adding one or more subscribers to a service. Users or system administrators having access to VSS 16 may add multiple types of subscribers to a service such as a subscriber from either a static recipient list (SRL) (e.g., addresses and groups) or a dynamic recipient list (DRL) (described in further detail below). The subscribers may be identified, for example, individually, in groups, or as dynamic subscribers in a DRL. Subscription interface 20 permits a user to specify particular criteria (e.g., filters, metrics, etc.) by accessing database system 12 and providing the user with a list of available filters, metrics, etc. The user may then select the criteria desired to be used for the service. Metadata may be used to increase the efficiency of the system.

A SRL is a list of manually entered names of subscribers of a particular service. The list may be entered using subscription interface 20 or administrator console 161. SRL entries may be personalized such that for any service, a personalization filter (other than a default filter) may be specified. A SRL enables different personalizations to apply for a login alias as well. For example, a login alias may be created using personalization engine 1632. Personalization engine 1632 enables subscribers to set preferred formats, arrangements, etc. for receiving content. The login alias may be used to determine a subscriber's preferences and generate service content according to the subscriber's preferences when generating service content for a particular subscriber.

A DRL may be a report which returns lists of valid user names based on predetermined criteria that are applied to the contents of a database such as database system 12. Providing a DRL as a report enables the DRL to incorporate any filtering criteria desired, thereby allowing a list of subscribers to be derived by an application of a filter to the data in database system 12. In this manner, subscribers of a service may be altered simply by changing the filter criteria so that different user names are returned for the DRL. Similarly, subscription lists may be changed by manipulating the filter without requiring interaction with administrator console 161. Additionally, categorization of each subscriber may be performed in numerous ways. For example, subscribers may be grouped via agent filters. In one specific embodiment, a DRL is created using DSS Agent™ offered by MicroStrategy.

VSS 16 is shown in more detail in FIG. 3b. According to one embodiment, VSS 16 comprises administrator console 161, voice service API 162 and backend server 163. Administrator console 161 is the main interface of system 100 and is used to view and organize objects used for voice broadcasting. Administrator console 161 provides access to a hierarchy of additional interfaces through which a system administrator can utilize and maintain system 100. Administrator console 161 comprises system administrator module 1611, scheduling module 1612, exceptions module 1613, call settings module 1614, address handling module 1615, and service wizard 1616.

System administrator module 1611 comprises a number of interfaces that enable selection and control of the parameters of system 100. For example, system administrator module 1611 enables an administrator to specify and/or modify an email system, supporting servers and a repository server with which system 100 is to be used. System administrator 1611 also enables overall control of system 100. For example, system administrator module is also used to control the installation process and to start, stop or idle system 100. According to one embodiment, system administrator 1611 comprises one or more graphical user interfaces (GUIs).

Scheduling module 1612 comprises a number of interfaces that enable scheduling of voice services. Voice services may be scheduled according to any suitable methodology, such as according to scheduled times or when a predetermined condition is met. For example, the predetermined condition may be a scheduled event (time-based) including, day, date and/or time, or if certain conditions are met. In any event, when a predetermined condition is met for a given service, system 100 automatically initiates a call to the subscribers of that service. According to one embodiment, scheduling module 1612 comprises one or more GUIs.

Exceptions module 1613 comprises one or more interfaces that enable the system administrator to define one or more exceptions, triggers or other conditions. According to one embodiment, exceptions module 1613 comprises one or more GUIs.

Call settings module 1614 comprises one or more interfaces that enable the system administrator to select a set of style properties for a particular user or group of users. Each particular user may have different options for delivery of voice services depending on the hardware over which their voice services are to be delivered and depending on their own preferences. As an example of how the delivery of voice services depends on a user's hardware, the system may deliver voice services differently depending on whether the user's terminal device has voice mail or not. As an example of how the delivery of voice services depends on a user's preferences, a user may chose to have the pitch of the voice, the speed of the voice or the sex of the voice varied depending on their personal preferences. According to one embodiment, call settings module 1614 comprises one or more GUIs.

Address handling module 1615 comprises one or more interface that enable a system administrator to control the address (e.g., the telephone number) where voice services content is to be delivered. The may be set by the system administrator using address handling module 1615. According to one embodiment, address handling module 1615 comprises one or more GUIs.

Voice service wizard module 1616 comprises a collection of interfaces that enable a system administrator to create and/or modify voice services. According to one embodiment, service wizard module 1616 comprises a collection of interfaces that enable a system administrator to define a series of dialogs that contain messages and inputs and determine the call flow between these dialogs based on selections made by the user. The arrangement of the messages and prompts and the flow between them comprises the structure of a voice service. The substance of the messages and prompts is the content of a voice service. The structure and content are defined using service wizard module 1616.

Voice service API 162 (e.g., MicroStrategy Telecaster Server API) provides communication between administrator console 161 and backend server 163. Voice Service API 162 thus enables information entered through administrator console 161 to be accessed by backend server 163 (e.g., MicroStrategy Telecaster Server).

Backend server 163 utilizes the information input through administrator console 161 to initiate and construct voice services for delivery to a user. Backend server 163 comprises report formatter 1631, personalization engine 1632, scheduler 1633 and SQL engine 1634. According to one embodiment, backend server 163 comprises MicroStrategy Broadcast Server. Report formatter 1631, personalization engine 1632, and scheduler 1633 operate together, utilizing the parameters entered through administrator console 161, to initiate and assemble voice services for transmission through call server 18. Specifically, scheduler 1633 monitors the voice service schedules and initiates voice services at the appropriate time. Personalization engine 1632 and report formatter 1631 use information entered through service wizard 1616, exceptions module 1613, call settings module 1614, and address module 1615, and output provided by DSS server 14 to assemble and address personalized reports that can be sent to call server 18 for transmission. According to one embodiment, report formatter 1631 includes an XML based markup language engine to assemble the voice services. In a particular embodiment, report formatter includes a Telecaster Markup Language engine offered by MicroStrategy Inc. to assemble the call content and structure for call server 18.

SQL engine 1634 is used to make queries against a database when generating reports. More specifically, SQL engine 1634 converts requests for information into SQL statements to query a database.

Repository 164 may be a group of relational tables stored in a database. Repository 164 stores objects which are needed by system 100 to function correctly. More than one repository can exist, but preferably the system 100 is connected to only one repository at a time.

According to one embodiment, a call server 18 is used to accomplish transmission of the voice services over standard telephone lines. Call server 18 is shown in more detail in FIG. 3c. According to one embodiment, call server 18 comprises software components 181 and hardware components 182. Software components 181 comprise call database 1811, mark-up language parsing engine 1812, call builder 1813, text-to-speech engine 1814, response storage device 1815 and statistic accumulator 1816.

Call database 1811 comprises storage for voice services that have been assembled in VSS 16 and are awaiting transmission by call server 18. These voice services may include those awaiting an initial attempt at transmission and those that were unsuccessfully transmitted (e.g., because of a busy signal) and are awaiting re-transmission. According to one embodiment, call database 1811 comprises any type of relational database having the size sufficient to store an outgoing voice service queue depending on the application. Call database 1811 also comprises storage space for a log of calls that have been completed.

Voice services stored in call database 1811 are preferably stored in a mark-up language. Mark-up language parsing engine 1812 accepts these stored voice services and separates the voice services into parts. That is, the mark-up language version of these voice services comprises call content elements, call structure elements and mark-up language instructions. Mark-up language parsing engine 1812 extracts the content and structure from the mark-up language and passes them to call builder 1813.

Call builder 1813 is the module that initiates and conducts the telephone call to a user. More specifically, call builder dials and establishes a connection with a user and passes user input through to markup language parsing engine 1812. In one embodiment, call builder 1813 comprises "Call Builder" software available from Call Technologies Inc. Call builder 1813 may be used for device detection, line monitoring for user input, call session management, potentially transfer of call to another line, termination of a call, and other functions.

Text-to-speech engine 1814 works in conjunction with mark-up language parsing engine 1812 and call builder 1813 to provide verbal communication with a user. Specifically, after call builder 1813 establishes a connection with a user, text-to-speech engine 1814 dynamically converts the content from mark-up language parsing engine 1812 to speech in real time.

A voice recognition module may be used to provide voice recognition functionality for call server 181. Voice recognition functionality may be used to identify the user at the beginning of a call to help ensure that voice services are not presented to an unauthorized user or to identify if a human or machine answers the call. This module may be a part of call builder 1813. This module may also be used to recognize spoken input (say "one" instead of press "1"), enhanced command execution (user could say "transfer money from my checking to savings"), enhanced filtering (instead of typing stock symbols, a user would say "MSTR"), enhanced prompting, (saying numeral values).

User response module 1815 comprises a module that stores user responses and passes them back to intelligence server 16. Preferably, this is done within an AVP. During a telephone call, a user may be prompted to make choices in response to prompts by the system. Depending on the nature of the call, these responses may comprise, for example, instructions to buy or sell stock, to replenish inventory, or to buy or rebook an airline flight. User response module 1815 comprises a database to store these responses along with an identification of the call in which they were given. The identification of the call in which they were given is important to determining what should be done with these responses after the call is terminated. User responses may be passed back to intelligence server 16 after the call is complete. The responses may be processed during or after the call, by the system or by being passed to another application.

Statistics accumulator 1816 comprises a module that accumulates statistics regarding calls placed by call builder 1813. These statistics including, for example, the number of times a particular call has been attempted, the number of times a particular call has resulted in voice mail, the number of times a user responds to a call and other statistics, can be used to modify future call attempts to a particular user or the structure of a voice service provided to a particular user. For example, according to one embodiment, statistics accumulator 1816 accumulates the number of times a call has been unsuccessfully attempted by call builder 1813. This type of information is then used by call server 18 to determine whether or not the call should be attempted again, and whether or not a voice mail should be left.

Call server 18 also comprises certain hardware components 182. As shown in FIG. 1c, hardware components 182 comprise processor 1821 and computer telephone module 1822. According to one embodiment, processor 1821 comprises a Pentium II processor, available from Intel, Inc. Module 1822 provides voice synthesis functionality that is used in conjunction with Text to Speech engine 1814 to communicate the content of voice services to a user. Module 1822 preferably comprises voice boards available from Dialogic, Inc. Other processors and voice synthesizers meeting system requirements may be used.

The system and method of the present invention may form an integral part of an overall commercial transaction processing system.

According to one embodiment of the present invention, a system and method that enable closed-loop transaction processing are provided. The method begins with the deployment of an IVB by executing a service. As detailed above, this includes generating the content and combining this with personalization information to create an active voice page. Call server 18 places a call to the user. During the call, information is delivered to the user through a voice-enabled terminal device (e.g., a telephone or cellular phone).

During the IVB, a user may request a transaction, service, further information from the database or other request, e.g., based on options presented to the user. These will generically be referred to as transactions. The request may be, but is not necessarily, based on or related to information that was delivered to the user. According to one embodiment, the request comprises a user response to a set of options and/or input of information through a telephone keypad, voice input or other input mechanism. According to another embodiment, the request can be made by a user by speaking the request. Other types of requests are possible.

According to one embodiment, the user responses are written to a response collection, which along with information stored in the active voice page, can be used to cause a selected transaction to be executed. According to one embodiment, the active voice page comprises an XML-based document that includes embedded, generic requests, e.g., a request for a transaction, or a request for additional information (a database query). These embedded requests are linked with, for example option statements or prompts so that when a user enters information, the information is entered into the generic request and thus completes a specific transaction request. For example, in the example if a user exercises an option to buy a particular stock, that stock's ticker symbol is used to complete a generic "stock buy" that was embedded in the active voice page.

According to one embodiment, tokens are used to manage user inputs during the IVB. A token is a temporary variable that can hold different values during an IVB. When a user enters input, it is stored as a token. The token value is used to complete a transaction request as described above. According to one embodiment, the system maintains a running list of tokens, or a response collection, during an IVB.

In order to complete the requested transaction, the user responses (and other information from the active voice page) may need to be converted to a particular format. The format will depend, for example, on the nature and type of transaction requested and the system or application that will execute the transaction. For example, a request to purchase goods through a web-site may require the information to be in HTML/HTTP format. A request for additional information may require and SQL statement. A telephone-based transaction may require another format.

Therefore, the transaction request is formatted. According to one embodiment, the transaction is formatted to be made against a web-based transaction system. According to another embodiment, the transaction request is formatted to be made against a database. According to another embodiment, the transaction is formatted to be made against a telephone-based transaction system. According to another embodiment, the transaction is formatted to be made via e-mail or EDI. Other embodiments are possible.

In one embodiment, the formatted transaction request comprises an embedded transaction request. The system described in connection with FIGS. 1–3 provides interactive voice services using TML, a markup language based on XML. Using TML active voice pages are constructed that contain the structure and content for a interactive voice broadcast including, inter alia, presenting the user with options and prompting the user for information. Moreover in connection with OPTION and PROMPT elements, active voice pages also can include embedded statements such as transaction requests. Therefore, the formatting for the transaction request can be accomplished ahead of time based on the particular types of transactions the user may select.

For example, in connection with an exemplary stock purchase, an active voice page can include an embedded transaction request to sell stock in the format necessary for a particular preferred brokerage. The embedded statement would include predefined variables for the name of the stock, the number of shares, the type of order (market or limit, etc.), and other variables. When the user chooses to exercise the option to buy or sell stock, the predefined variables are replaced with information entered by the user in response to OPTION or PROMPT elements. Thus, a properly formatted transaction request is completed.

In the system of FIGS. 1–3, TML parsing engine in call server 18 includes the functionality necessary to generate the properly formatted transaction request as described above. For example, in connection with the embodiment described above, the TML parsing engine shown in FIG. 3c reads the active voice pages. When the TML parsing engine reads an OPTION element that includes and embedded transaction request, it stores the transaction request, and defines the necessary variables and variable locations. When the user exercises that OPTION, the user's input is received by the TML parsing engine and placed at the memory locations to complete the transaction request This technique could be used, for example, to generate a formatted transaction request for web-site.

According to another embodiment, where the transaction request is made via a natural language, voice request, a formatted transaction request can be generated in a number of ways. According to one embodiment, speech recognition technology is used to translate the user's request into text and parse out the response information. The text is then used to complete an embedded transaction request as described above. According to another embodiment, speech recognition software is used to translate the request to text. The text is then converted to a formatted request based on a set of known preferences.

A connection is established with the transaction processing system. This can be accomplished during, or after the IVB. According to one embodiment, the transaction processing system comprises a remotely located telephone-based transaction site. For example, in the system shown in FIGS. 1–3, call server 18, through the TML parsing engine 1812, establishes a connection with a telephone-based transaction processing site.

According to another embodiment, the transaction processing system comprises a remotely based web-site. According to this embodiment, the formatted request includes a URL to locate the web-site and the system accesses the site through a web connection using the formatted request. Alternatively, the formatted request includes an e-mail address and the system uses any known email program to generate an e-mail request for the transaction.

After the connection is established, the transaction is processed by the transaction processing site and the user is notified of the status of the transaction. If the transaction is completed in real-time, the user may be immediately-notified. If the transaction is executed after the IVB, the user may be called again by the system, sent an e-mail, or otherwise notified when the transaction has been completed.

According to one particular embodiment, the system comprises the interactive voice broadcasting system shown and described in FIGS. 1–3 and the transaction is accomplished in real-time. In this embodiment, confirmation of the transaction is returned to TML parsing engine 1812 shown in FIG. 3 and translated to speech in text-to-speech engine 1814 and presented to the user during the IVB. More specifically, and similar to the process described with respect to embedded formatted transaction requests, TML also enables embedding of a response statement. Thus, when the transaction is processed and confirmation of the transaction is returned to the system, an embedded confirmation statement is conveyed to the user through TML parsing engine 1812 after being converted to speech in text-to-speech engine 1814.

Figure 4:
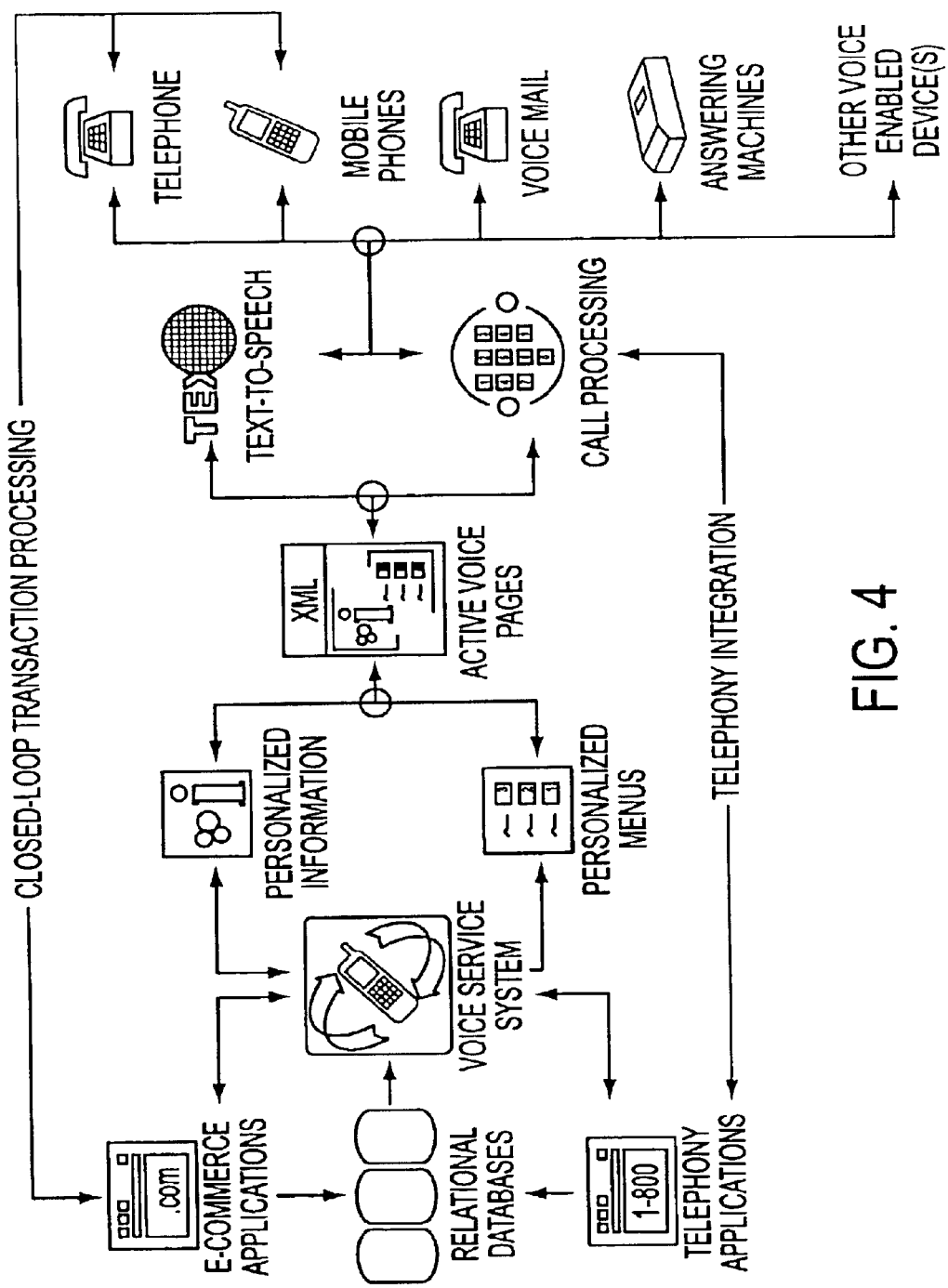
FIG. 4 is a schematic block diagram of a commercial transaction processing system according to an embodiment of the present invention.

FIG. 4 schematically depicts one example of how the system and method of the present invention would fit into such a commercial transaction processing system. Working from left to right in FIG. 4, the system begins and ends with information stored in relational databases. One of the primary purposes of information is in making decisions. Thus, the information in the databases is most useful if provided to someone who desires it in a timely fashion.

A voice service system is provided to enable access to the information in the databases. The voice service system utilizes personalization information and personalized menus to construct AVPs pages that enable the information to be delivered to a user verbally. Moreover, the AVPs pages, not only enable information to be presented to the user. But, they also enable the user to provide information back to the voice service system for additional processing.

According to the embodiment shown in FIG. 4, once the AVPs are constructed by voice service system, they are processed and the content is delivered to a user verbally in an IVB. Thus, call processing and text-to-speech technology are used to establish a telephone connection with a user and convert the active voice pages to speech for presentation to the user. As shown in FIG. 4, the IVB may be delivered to a user in many devices, including a telephone, a mobile phone, voice mail, an answering machine or any other voice-enabled device.

During the IVB, depending on the content that is being delivered, control may be passed to an e-commerce application for the user to complete a transaction based on the information presented. For example, if the user has requested information about sales on a particular brand of merchandise, the user may be connected with a particular retailer in order to complete a transaction to buy a particular good or service. Information about this transaction is then added to the databases and thus may be advantageously accessed by other users.

It may not be economical for some potential users of a voice broadcasting system to buy and/or maintain their own telephony hardware and software as embodied in call server 18. In such a case, a voice service bureau may be maintained at a remote location to service users voice service requests. A voice service bureau and a method of using a voice service bureau according to various embodiments of the present invention is described in conjunction with FIGS. 5–6.

In one embodiment, a voice service bureau may comprise one or more call servers and call databases that are centrally located and enable other voice service systems to generate a call request and pass the call request to the VSB to execute a call. In this way the other voice service systems do not need to invest in acquiring and maintaining call data bases, call servers, additional telephone lines and other equipment or software. Moreover, the VSB facilitates weeding out usage of illegal numbers and spamming by number checking implemented through its web server.

Figure 5:
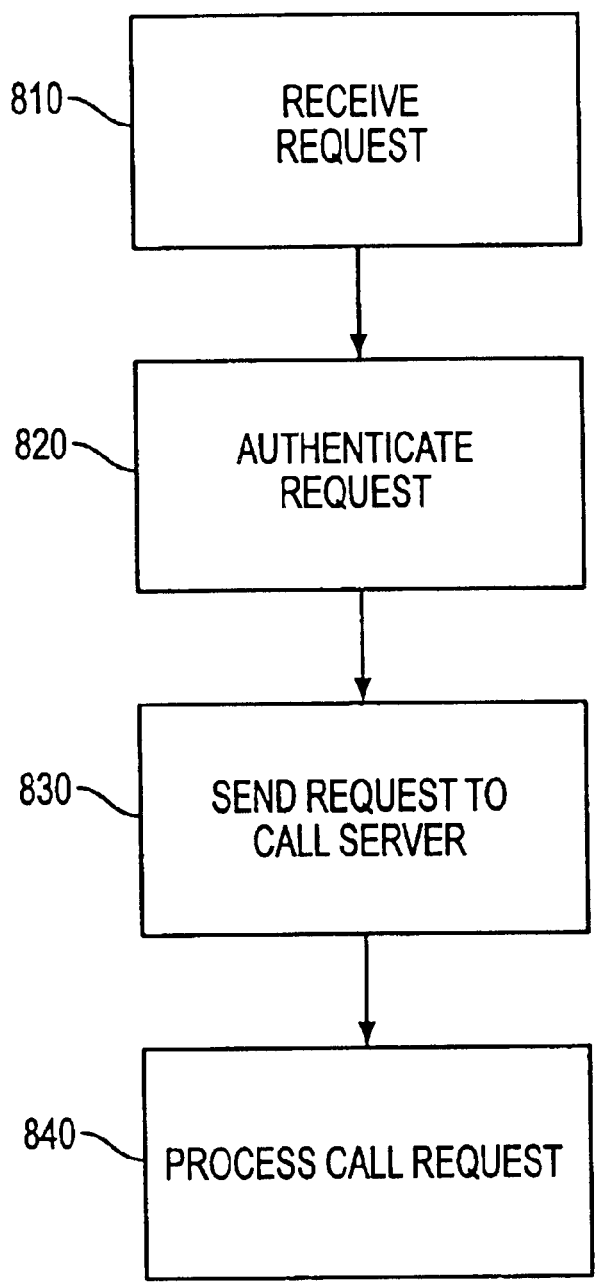
FIG. 5 is a flow chart of a method of using a voice service bureau according to an embodiment of the present invention.

A voice service bureau and a method of using a voice service bureau according to one embodiment are described in conjunction with FIGS. 5–6. FIG. 5 depicts a method of utilizing a voice service bureau according to one embodiment of the present invention. The method begins in step 810 with a request to place one or more telephone calls received through a computer network.

According to one embodiment, the voice service bureau is maintained at a location distant from the voice service system. Therefore, in order for a voice service to be processed by the voice service bureau, in step 810 the voice service is sent to the voice services bureau, preferably over some secure line of communication. According to one embodiment, the request is sent to the voice service bureau through the Internet using secure HTTPS. HTTPS provides a secure exchange of data between clients and the voice service bureau using asymmetric encryption keys based on secure server certificates. In another embodiment, SSL HTTP protocol is used to send a call request to the voice service bureau. Both of these protocols help ensure that a secure channel of communication is maintained between the voice service system and the voice service bureau. Other security techniques may be used.

When a request for a call or telecast is received, by the VSB, the request is authenticated by the voice service bureau in step 820. According to one embodiment, the authenticity of the request is determined in at least two ways. First, it is determined whether or not the request was submitted from a server having a valid, active server certificate. More specifically, requests may be typically received via a stream of HTTPS data. Each such request originating from a server with a valid server certificate will include an embedded code (i.e., server certificate) that indicates the request is authentic. In addition to the use of server certificates, each request may also be authenticated using an identification number and password. Therefore, if the request submitted does not include a valid server certificate and does not identify a valid I.D./password combination, the request will not be processed. The step of authenticating also comprises performing any necessary decryption. According to one embodiment, any errors that are encountered in the process of decrypting or authenticating the call request are logged an error system and may be sent back to the administrator of the sending system. Other methods of authenticating the request are possible.

Each properly authenticated request is sent to a call server (step 830) and processed (step 840). According to one embodiment, the voice service bureau comprises a number of call servers. According to one embodiment, the calls are sent to a call database, and processed as set forth herein in conjunction with the explanation of call server 18.

Figure 6A:
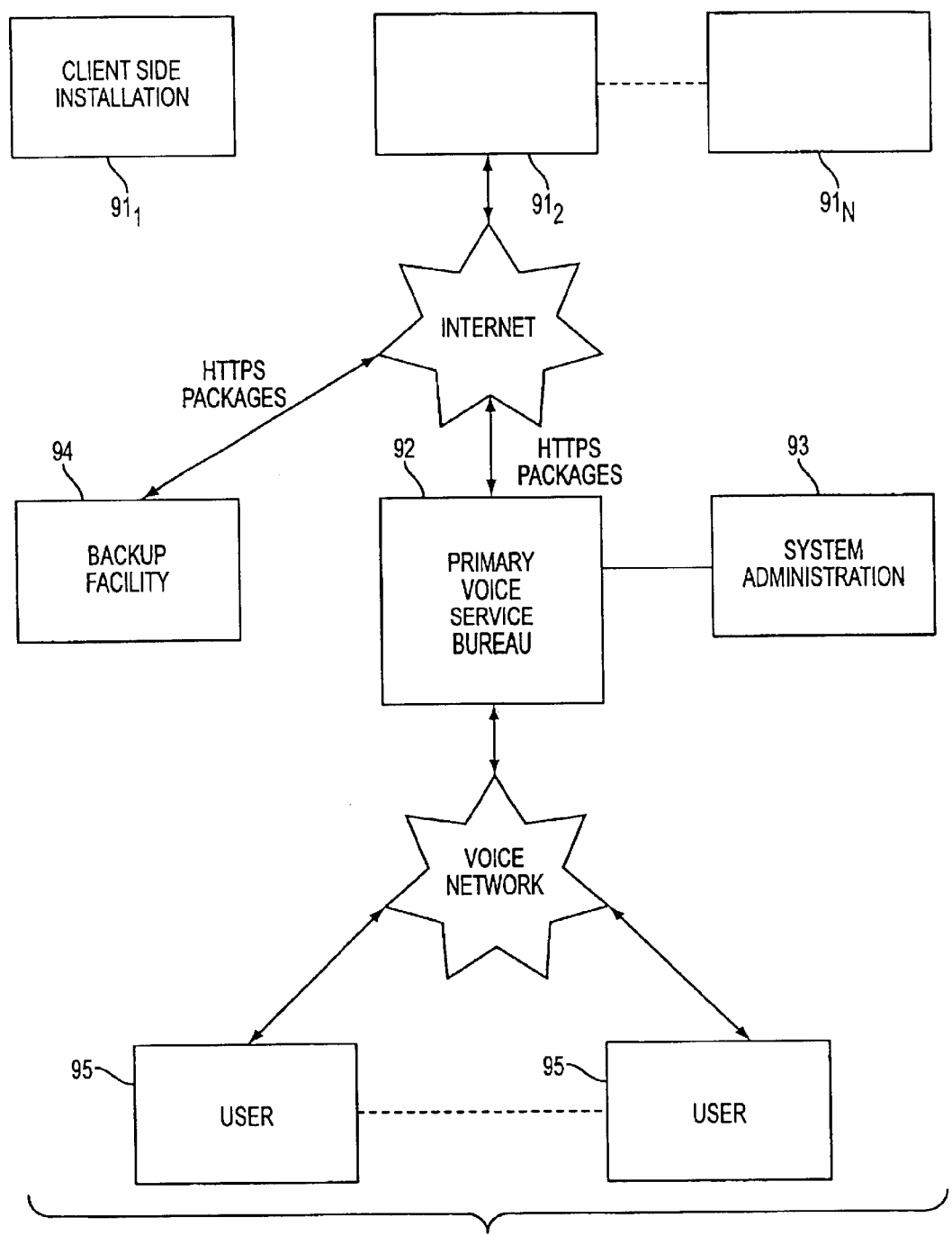
FIG. 6a is a schematic block diagram of a voice service system incorporating a voice service bureau according to one embodiment of the present invention.

One embodiment of a voice service bureau will now be explained in conjunction with FIGS. 6a–6c. FIG. 6a depicts a system comprising a plurality of client side installations 91, a primary voice bureau 92, a system administrator 93, a backup voice service bureau 94, and a plurality of users 95. Client side installations 91 communicate with voice service bureau 92 through a computer network. Voice service bureau 92 communicates with users 95 through a voice network. According to one embodiment, the computer network comprises the internet and client side installations 91 communicate with voice service bureau 92 using HTTPS as described above, and the voice network comprises a public telephone network.

According to one embodiment, client side installations 91 are substantially identical to the system shown in FIG. 4 except for the elimination of call server 18. In the system of FIG. 6a, the functionality of call server 18 is performed by VSB 92. As shown in this embodiment, VSB 92 can service multiple client side installations 91, to 91n. According to another embodiment, client-side installation functionality may be included within VSB 92. According to this embodiment VSB 92 constitutes a fully functional voice service that is accessible through email, telephone or other interfaces.

According to this embodiment, when voice services have been assembled by intelligence server 16, a request to have the voice services transmitted is sent via a secure network connection through the computer network shown to primary voice bureau 92 and backup voice service bureau 94 as described above. According to one embodiment, the request comprises a mark-up language string that contains the voice service structure and content and personal style properties and other information. As described above, voice bureau 92 authenticates the request, queues the voice services and sends telecasts to users 95 through the voice network.

Figure 6B:
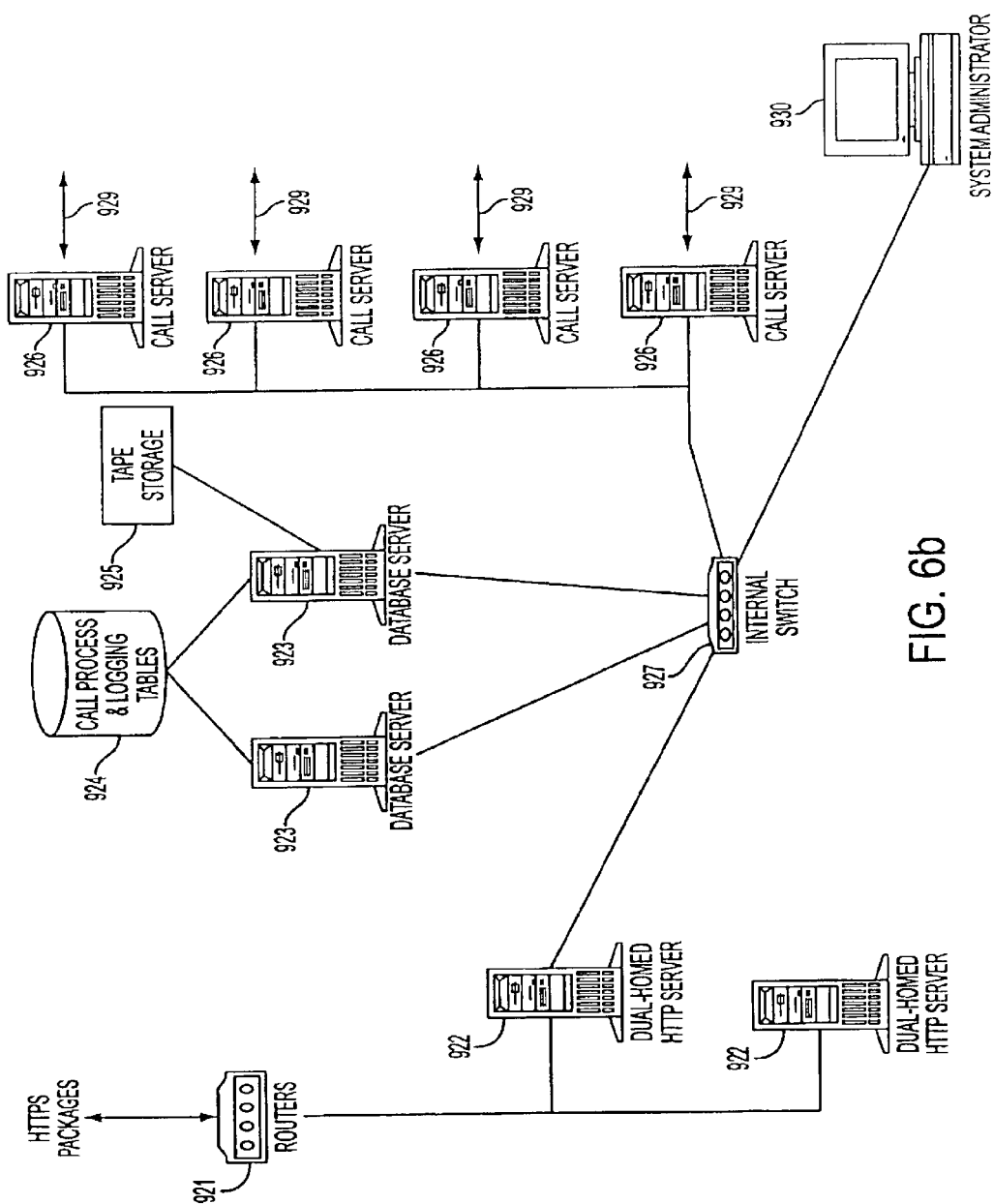
FIG. 6b is block diagram of a primary voice bureau according to one embodiment of the present invention.
Figure 6C:
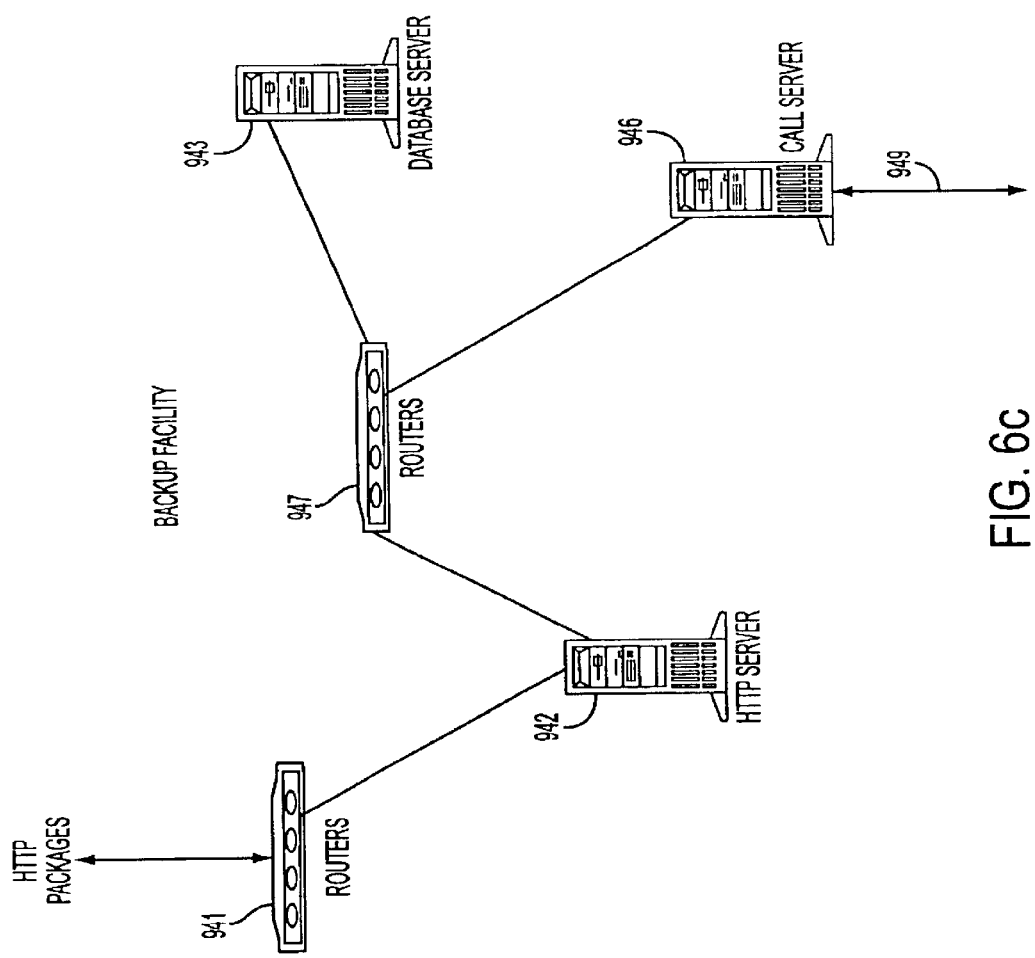
FIG. 6c is a block diagram of a backup voice bureau according to another embodiment of the present invention.

A block diagram of one embodiment of primary voice bureau 92 is shown in FIG. 6b. According to this embodiment, primary voice bureau comprises routers 921, dual-homed servers 922, database servers 923, call database 924, backup storage 925, call servers 926, internal switch 927, and system administrator 928. Routers 921 receive call requests via a computer network and pass them along to one of the two dual-homed servers 922. Router 921 monitors activity on servers 922 and forwards call requests to one of the two depending on availability.

Dual-homed servers 922 comprise servers configured to receive and send HTTPS email. As part of their receiving function, dual-homed servers 922 are configured to perform the authentication processing described above. According to one embodiment, dual-homed servers 922 determine whether the incoming request originated from a server with an active server certificate and also determine if the request contains a valid I.D./password combination. Once dual-homed servers 922 have authenticated the incoming request, they forward the request to be queued in call database 924. As part of their sending function, dual-homed servers 922 are configured to format and send HTTPS email. As discussed above, during a telecast a user may request that further information be accessed from a database or that some transaction be performed. According to one embodiment, these user requests are forwarded back to the originating system via HTTPS email by dual-homed servers 922. Dual-homed servers 922 are load balanced to facilitate optimal performance and handling of incoming call requests.

Database servers 923, call database 924, and backup storage 925 together comprise a call request queuing system. Primary voice bureau 92 is configured to handle a large number of call requests. It may not be possible to process call requests as they arrive. Therefore, call requests are queued in call database 924. According to one embodiment, call database 924 comprises a relational database that maintains a queue of all call requests that need to be processed as well as logs of calls that have been processed. According to another embodiment, primary VSB 92 may include a failover measure that enables another system server to become the call database if call database 924 should fail.

Database servers 923 are configured to control access to call database 924. According to one embodiment, database servers may be optimized to generate SQL statements to access entries in call database at high speed. Database servers 923 also control storage of call requests and call logs in call database 924.

Call servers 926 each are configured to format and send telecasts. According to one embodiment, each of call servers 926 is substantially identical to call server 18 shown in FIG. 3c. More specifically, each of call servers 926 receives requests for telecasts, parses the call content from the mark-language, establishes a connection with the user through phone lines 929, and receives user responses. According to one embodiment, call servers 926 comprise a clustered architecture that facilitates message recovery in the event of server failure.

Primary voice bureau 92 is controlled by system administrator 93 and internal switch 927. System administrator controls switch 927 and thus controls the flow of call requests to call database 924 from dual homed servers 922 and to call servers 926 from call database 924.

System administrator 93 is also configured to perform a number of other services for primary voice bureau 92. According to one embodiment, system administrator 93 also comprises a billing module, a statistics module, a service module and a security module. The billing modules tabulates the number of voice service requests that come from a particular user and considers the billing plan that the customer uses so that the user may be appropriately billed for the use of voice bureau 92. The statistics module determines and maintains statistics about the number of call requests that are processed by voice bureau 92 and statistics regarding call completion such as, e.g., success, failed due to busy signal and failed due to invalid number. These statistics may be used, for example, to evaluate hardware requirements and modify pricing schemes. The security module monitors activity on voice bureau 92 to determine whether or not any unauthorized user has accessed or attempted to access the system. The service module provides an interface through which primary voice bureau 92 may be monitored, for example, to determine the status of call requests. Other service modules are possible. Moreover, although these services are described as distinct modules, their functionality could be combined and provided in a single module.

Backup voice service bureau 94 receives a redundant request for voice services. Backup voice service bureau 94 processes the requests only when primary voice service bureau is offline or busy. One embodiment of backup voice service bureau 94 is shown in FIG. 6c. Backup voice bureau 94 comprises routers 941, HTTP server 942, database server 943, call server 946 and routers 947. Each of these components performs a function identical to the corresponding element in primary voice bureau 92. Router 947 replaces switch 927. Router 947 controls the forwarding of call requests to database server 943 for queuing in an internal database, and the forwarding of call requests to call server 946 from database server 943.

The systems and methods discussed above are directed to outbound broadcasting of voice services. Nevertheless, in certain situations, for example when the out bound telecast is missed, it is desirable to for a voice service system to enable inbound calling. According to another embodiment, a method and system for providing integrated inbound and outbound voice services is disclosed.

Figure 7:
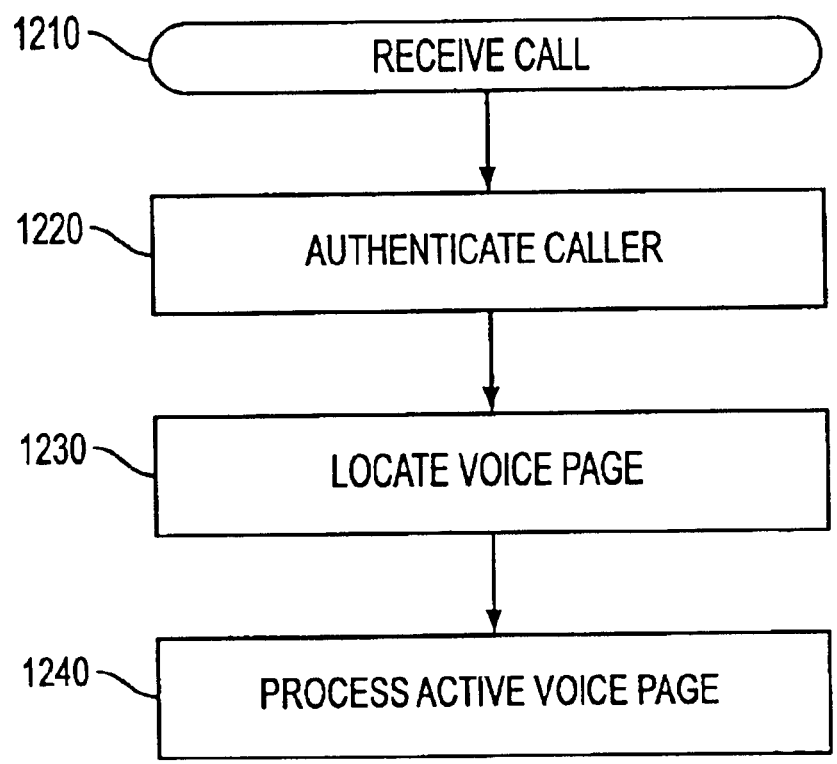
FIG. 7 is a flow chart illustrating a method for integrating inbound and outbound voice services.

A method for providing inbound access to voice services according to one embodiment of the present invention is shown in FIG. 7. According to FIG. 7, the method begins with receipt of a call requesting voice services in step 1210. To help ensure system integrity and to prevent unauthorized access, a call request is authenticated in step 1220. According to one embodiment, each incoming caller is automatically prompted to enter a login identifier and a PIN. According to another embodiment, an automatic number identification system is used, in addition to a login identifier and PIN system, to determine whether or not the user is calling from an authorized device. According to another embodiment, speaker recognition technology is utilized to identify a caller. According to this embodiment, voice prints for each user of the voice service system are stored as identifiers. When an inbound call is connected, pattern matching techniques are used verify the user's speech against the previously stored voice prints. Other security measures are possible.

In step 1230, a voice page is located. As explained above, a telecast of a voice service is driven by an active voice page. Accordingly, a user calling in to access voice services locates the desired active voice page. According to one embodiment, the user is automatically placed into an active voice page of a voice service that the user missed. That is, the system chooses an active voice page that it was unable to deliver. According to this embodiment, when a call is undeliverable (e.g., when an answering machine picks up), the active voice page for that call is placed in memory in a "voice site" table or as an active voice page on a web site and addressed using the user's identification. When the user calls in to retrieve the voice service, after the user logs in, the table or web site will be searched for an active voice page that corresponds to their identification. If such a page exists, it is executed by the call server.

Other possibilities exist for accessing active voice pages through inbound calling. According to another embodiment, the system maintains a log of all voice services sent and provides an inbound user an option to select one of their previous voice services. According to another embodiment, an inbound caller is automatically placed into an active voice page that presents the user with an option to select one of that user's most frequently used services. According to still another embodiment, the user is allowed to search for past active voice pages by date or content. For example, the user may be prompted to enter a date on or near which the desired voice page was executed. According to another embodiment, the user may use the telephone keys to enter a search term and search the content of any previously executed active voice page that they are authorized to access or that is not secure.

Once an active voice page is located, the user navigates through the active voice page in step 1240. As described above, a user navigates through an active voice by exercising options, responding to prompts and otherwise entering input to the system. An inbound calling system would thus have access to the full functionality of the voice service system described in conjunction with FIGS. 1–6.

Figure 8:
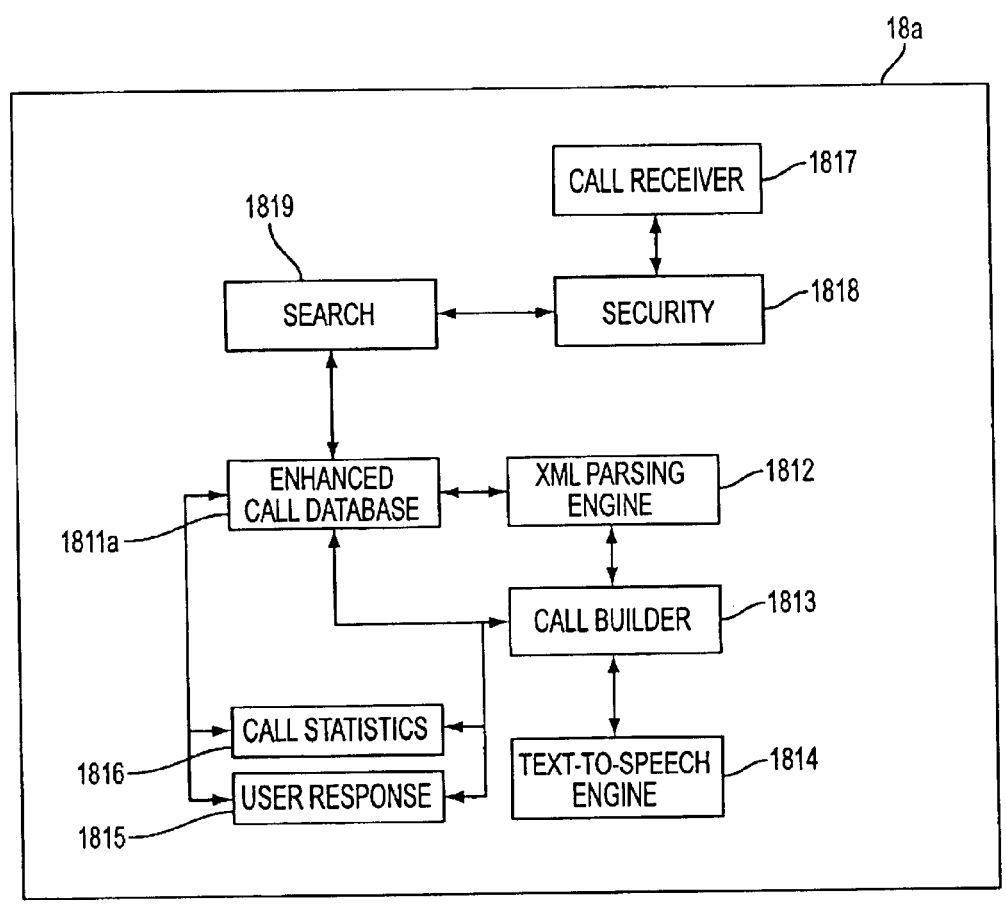
FIG. 8 is a block diagram of a call server configured to provide integrated inbound and outbound voice services.

FIG. 8 depicts a block diagram of a call server 18a that enables integrated inbound and outbound calling. In addition to the modules depicted in call server 18 of FIG. 3, call server 18a comprises call receiver module 1817, security module 1818 and search module 1819. Moreover, in the system for permitting inbound and outbound calling, call database 1811 has been replaced with an enhanced call database 1811a.

In order to receive inbound calls, call server 18a comprises call receiver module 1817. Although, call server 18 discussed above contains hardware permitting reception of calls as well as transmission of calls, it is not set up to receive calls. Call receiver module 1817 enables call server 18a to receive calls and routes the incoming calls to security module 1818. According to one embodiment, call receiver module comprises a software component designed to configure call server 18a to receive calls. Other embodiments are possible.

Received calls are forwarded to security module 1818 for authentication. According to one embodiment discussed above, incoming calls are authenticated using login I.D.'s and passwords. According to another embodiment, automatic number identification software is used to identify and authenticate callers. According to another embodiment, speech recognition and pattern matching techniques are used to identify a caller.

Authenticated calls may search for an active voice page using search module 1819. According to one embodiment, search module 1819 comprises a search engine designed specifically to search active voice pages. According to one embodiment discussed above, active voice pages utilize an XML-based language and search module 1819 comprises an XML-based search engine. According to another embodiment, search module 1819 comprises a SQL engine designed to make queries against a relational or other type of database.

The active voice pages that are being search are stored in enhanced call database 1811a. In addition to its facilities to queue and log calls, enhanced call database 1811 includes facilities to catalog active voice pages. According to one embodiment, enhanced call database comprises a relational or other type of database. According to this embodiment, enhanced call database is used to store and categorize active voice pages and corresponding parameters, such as expiration dates for active voice pages. Other storage facilities are possible.

Various features and functions of the present invention extend the capabilities of previously known information delivery systems. One such system is MicroStrategy's Broadcaster version 5.6. The features and functions of the present invention are usable in conjunction with Broadcaster and other information delivery systems or alone. Other products may be used with the various features and functions of the invention including, but not limited to, MicroStrategy's known product suite.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A method for providing interactive, real-time, voice transmission of personalized information to at least one user comprising the steps of:

enabling the at least one user to subscribe to at least one service that can output personalized content;

generating personalized content for the at least one user;

generating a call structure to deliver the personalized content to the at least one user, the call structure comprising at least one active voice page having one or more personalized menus to enable the at least one user to navigate through the personalized content;

determining a set of style properties associated with the at least one user;

enabling the at least one service to initiate an interactive voice-enabled communication session between the at least one user and a call server;

generating speech output from the call structure using the style properties; and, transmitting the speech output to the at least one user using the style properties.

2. The method of claim 1 wherein generating personalized content comprises generating content from text.

3. The method of claim 1 wherein generating personalized content comprises generating the one or more personalized menus from output from an on-line analytical processing system.

4. The method of claim 1 wherein generating call structure comprises associating the output from an on-line analytical processing system with a style sheet.

5. The method of claim 1 wherein generating call structure comprises generating static call structure.

6. The method of claim 1 wherein generating call structure comprises generating dynamic call structure.

7. The method of claim 6 wherein the dynamic call structure depends on output from an on-line analytical processing system.

8. The method of claim 1 wherein the style properties are determined based on user preferences of the at least one user.

9. The method of claim 1 wherein the style properties are determined based on hardware of the at least one user.

10. The method of claim 1 wherein the call server comprises a remotely located call server and initiating the interactive voice-enabled communication session comprises:

transmitting a call request to the remotely located call server, the call request comprising the call structure and the style properties; and, initiating the interactive voice-enabled communication session between the remotely located call server and the at least one user.

11. A system for providing interactive, real-time, voice transmission of personalized information to at least one user comprising:

a subscription interface for enabling the at least one user to subscribe to at least one service that can output personalized content;

a server for generating personalized content and generating a call structure to deliver the personalized content to the at least one user, the call structure comprising at least one active voice page having one or more personalized menus to enable the at least one user to navigate through the personalized content;

a personalization engine for determining a set of style properties associated with the at least one user;

a call server for enabling the at least one service to initiate an interactive voice-enabled communication session with the at least one user;

a text to speech engine for generating speech output from the call structure using the style properties; and, a voice network for transmitting the speech output to the at least one user using the style properties.

12. The system of claim 11 wherein the server generates personalized content from text.

13. The system of claim 11 wherein the server generates the one or more personalized menus from output from an on-line analytical processing system.

14. The system of claim 11 wherein the server generates call structure by associating the output from an on-line analytical processing system with a style sheet.

15. The system of claim 11 wherein the server generates static call structure.

16. The system of claim 11 wherein the server generates dynamic call structure.

17. The system of claim 16 wherein the dynamic call structure depends on the output from an on-line analytical processing system.

18. The system of claim 11 wherein the personalization engine determines style properties based on user preferences of the at least one user.

19. The system of claim 11 wherein the personalization engine determines style properties based on hardware of the at least one user.

20. The system of claim 11 wherein the call server comprises a remotely located call server, the system further comprising:

means for transmitting a call request to the remotely located call server, the call request comprising the call structure and the style properties.

21. A method for providing interactive, real-time, voice transmission of personalized information to at least one user comprising the steps of:

enabling the at least one user to subscribe to at least one service that can output personalized content;

generating personalized content for the at least one user;

generating a call structure to deliver the personalized content to the at least one user, the call structure comprising at least one active voice page having one or more personalized menus to enable the at least one user to navigate through the personalized content;

determining a set of style properties associated with the at least one user;

enabling the at least one service to initiate an interactive voice-enabled communication session between the at least one user and a call server;

generating speech output from the call structure using the style properties;

transmitting the speech output to the at least one user using the style properties; and enabling the at least one user to interact with the voice-enabled communication in real-time during the interactive voice-enabled communication session.

22. A system for providing interactive, real-time, voice transmission of personalized information to at least one user comprising:

a subscription interface for enabling the at least one user to subscribe to at least one service that can output personalized content;

a server for generating personalized content and generating a call structure to deliver the personalized content to the at least one user, the call structure comprising at least one active voice page having one or more personalized menus to enable the at least one user to navigate through the personalized content;

a personalization engine for determining a set of style properties associated with the at least one user;

a call server for enabling the at least one service to initiate an interactive voice-enabled communication session with the at least one user;

a text to speech engine for generating speech output from the call structure using the style properties;

a voice network for transmitting the speech output to the at least one user using the style properties; and a user response module that enables the at least one user to interact with the voice-enabled communication in real-time during the interactive voice-enabled communication session.

* * * * *